United States Patent
Sreedhar et al.

(10) Patent No.: US 12,081,577 B2
(45) Date of Patent: Sep. 3, 2024

(54) SYSTEMS AND METHODS FOR AUTOMATED RISK-BASED NETWORK SECURITY FOCUS

(71) Applicant: Fortinet, Inc., Sunnyvale, CA (US)

(72) Inventors: Rajiv Sreedhar, Sunnyvale (CA); Manuel Nedbal, Steyr (AT); Manoj Ahluwalia, San Jose, CA (US); Latha Krishnamurthi, San Jose, CA (US); Rajeshwari Rao, San Jose, CA (US); Damodar K Hegde, Santa Clara, CA (US); Jitendra B. Gaitonde, Cupertino, CA (US); Dave Karp, Oklahoma City, OK (US); Mark Lubeck, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 341 days.

(21) Appl. No.: 17/408,730

(22) Filed: Aug. 23, 2021

(65) Prior Publication Data
US 2023/0069738 A1    Mar. 2, 2023

(51) Int. Cl.
H04L 9/40    (2022.01)
(52) U.S. Cl.
CPC ............................ H04L 63/1433 (2013.01)
(58) Field of Classification Search
CPC .................. H04L 63/1433; H04L 63/101; H04L 63/1408
See application file for complete search history.

(56) References Cited

U.S. PATENT DOCUMENTS

| | | | | |
|---|---|---|---|---|
| 7,278,163 | B2* | 10/2007 | Banzhof | G06Q 10/0635 |
| | | | | 717/173 |
| 8,272,061 | B1* | 9/2012 | Lotem | H04L 63/1416 |
| | | | | 709/224 |
| 10,579,407 | B2 | 3/2020 | Ahuja et al. | |
| 10,944,723 | B2 | 3/2021 | Ahuja et al. | |
| 11,120,148 | B2 | 9/2021 | Sreedhar et al. | |
| 11,233,815 | B1* | 1/2022 | Rose | H04L 63/0236 |
| 2016/0373478 | A1* | 12/2016 | Doubleday | G06F 8/65 |
| 2018/0027006 | A1* | 1/2018 | Zimmermann | H04L 63/0227 |
| | | | | 726/11 |
| 2018/0219899 | A1* | 8/2018 | Joy | G06F 11/3433 |
| 2019/0182289 | A1* | 6/2019 | White | G06N 20/00 |
| 2019/0258525 | A1* | 8/2019 | Glenn | H04L 63/20 |
| 2020/0296134 | A1 | 9/2020 | Sreedhar et al. | |
| 2021/0126948 | A1 | 4/2021 | Nedbal et al. | |
| 2021/0192057 | A1* | 6/2021 | Helfman | G06F 21/577 |
| 2021/0211450 | A1* | 7/2021 | Aleidan | H04L 63/1433 |
| 2022/0046045 | A1* | 2/2022 | Rao | G06F 21/577 |
| 2022/0217174 | A1* | 7/2022 | Dhanabalan | G06T 11/00 |
| 2023/0052116 | A1* | 2/2023 | O'Reilly | H04L 41/16 |
| 2023/0205891 | A1* | 6/2023 | Yellapragada | H04L 63/1433 |
| | | | | 726/25 |

(Continued)

FOREIGN PATENT DOCUMENTS

| | | | | |
|---|---|---|---|---|
| RU | | 2535506 C2 * | 12/2014 | G06F 21/566 |
| WO | WO-2016036752 A2 * | | 3/2016 | H04L 41/142 |
| WO | WO-2016174668 A1 * | | 11/2016 | G06F 11/2094 |

*Primary Examiner* — Sarah Su
(74) *Attorney, Agent, or Firm* — Jaffery Watson Hamilton & DeSanctis LLP

(57) ABSTRACT

Systems, devices, and methods are discussed for automatically determining a risk-based focus in determining zero trust network access policy on one or more network elements.

12 Claims, 16 Drawing Sheets

(56) References Cited

U.S. PATENT DOCUMENTS

| | | | |
|---|---|---|---|
| 2023/0254336 A1* | 8/2023 | Kulshreshtha | H04L 63/1416 726/25 |
| 2023/0319070 A1* | 10/2023 | Subramanya | H04L 63/20 726/23 |

* cited by examiner

450

| ACL Rule | Traffic Source | Traffic Destination | Protocol | Port | Action |
|---|---|---|---|---|---|
| Rule 1 | Any | Web A | TCP | 80 | Allow |
| Rule 2 | Web | Application A | TCP | 443 | Allow |
| Rule 3 | Application A | Database A | TCP | 3016 | Allow |
| Rule 4 | Any | Web B | TCP | 80 | Allow |
| Rule 5 | Web B | Application B | TCP | 443 | Allow |
| Rule 6 | Application B | Database B | TCP | 3016 | Allow |
| Rule 7 | SECURED GROUP | Any | Any | Any | Block |
| Rule 8 | Any | SECURED GROUP | Any | Any | Block |
| Rule 9 | Any | Any | Any | Any | Block |

810

| Identified Workloads Touching Database C or Application A |||||
|---|---|---|---|
| Traffic Source | Traffic Destination | Protocol | Port |
| Application A | Web | TCP | 80 |
| Web | Database C | TCP | 443 |
| Endpoint X | Database C | TCP | 3020 |
| Endpoint Y | Application A | TCP | 80 |

| ACL Rule | Traffic Source | Traffic Destination | Protocol | Port | Action |
|---|---|---|---|---|---|
| Rule 1 | Application A | Web | TCP | 80 | Allow |
| Rule 2 | Web | Database C | TCP | 443 | Allow |
| Rule 3 | Endpoint X | Database C | TCP | 3020 | Allow |
| Rule 4 | Endpoint Y | Application A | TCP | 80 | Allow |
| Rule 5 | Any | Any | Any | Any | Allow |

| ACL Rule | Traffic Source | Traffic Destination | Protocol | Port | Action |
|---|---|---|---|---|---|
| Rule 1 | Application A | Web | TCP | 80 | Allow |
| Rule 2 | Web | Database C | TCP | 443 | Allow |
| Rule 3 | Endpoint X | Database C | TCP | 3020 | Allow |
| Rule 4 | Endpoint Y | Application A | TCP | 80 | Allow |
| Rule 5 | Any | Any | Any | Any | Block |

FIG. 8C

SYSTEMS AND METHODS FOR AUTOMATED RISK-BASED NETWORK SECURITY FOCUS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments discussed generally relate to securing network environments, and more particularly to systems and methods for automatically determining a risk-based focus in determining zero trust network access policy on one or more network elements.

BACKGROUND

It is not uncommon for network environments to support hundreds of software applications that all need to be secured. In some approaches, an operator is tasked with identifying allowed workloads, and manually modifying one or more firewalls with rules that allow network traffic for identified workloads and disallow network traffic for unidentified workloads. Then, the operator must forward test the implemented rules. This can become time consuming and is often subject to error due to the complexity of network traffic and the impact of security measures on other applications in the network environment.

Thus, there exists a need in the art for more advanced approaches, devices, and systems for developing and implementing security measures in a network environment.

SUMMARY

Various embodiments provide systems and methods for automatically determining a risk-based focus in determining zero trust network access policy for one or more network elements.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

FIGS. 8A-8C show example workloads and corresponding access control lists that may be identified and formed in accordance with various embodiments.

DETAILED DESCRIPTION

Figure 1A:
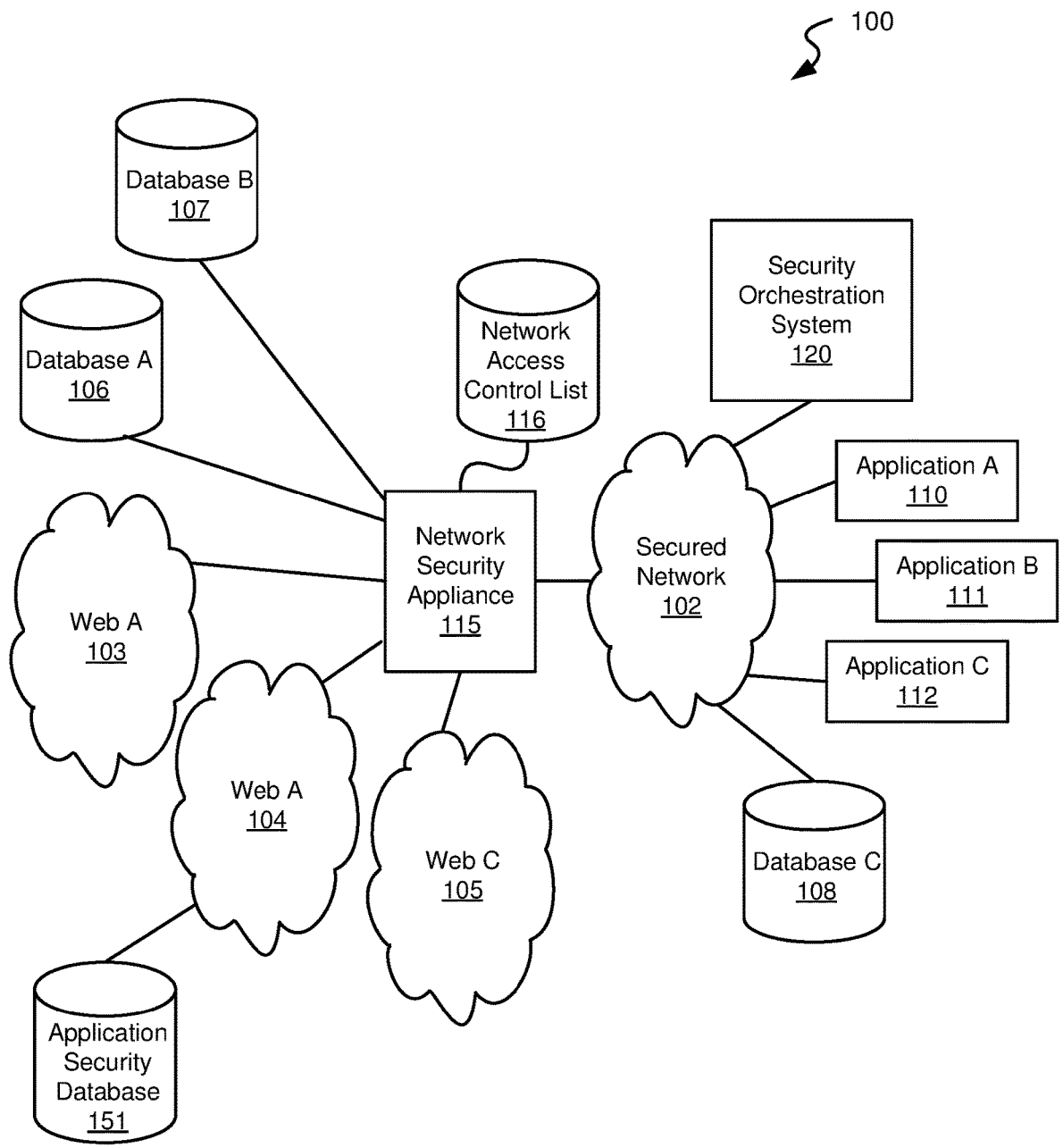
FIGS. 1A-1E illustrate a network architecture including a security orchestration system in accordance with some embodiments.

Various embodiments provide systems and methods for determining zero trust network access policy from a perspective focused on one or more network elements.

An example enterprise network may have hundreds of software applications, and each of the hundreds of applications may consist of several interconnected tiers having workloads communicating between each other. Such workloads utilize common network infrastructure including, but not limited to, domain name system (DNS), dynamic host configuration protocol (DHCP), network time protocol (NTP), the internet, local area networks (LAN), wide area networks (WAN) and/or management software (e.g., performance and/or health monitoring software). At the same time groups of clients (e.g., administrators, developers, testers, or the like) may desire access to the aforementioned workloads to perform their various tasks. In addition, network scanners and other administrative tools add complexity by connecting to each workload over a range of ports. In such an environment, determining a desired zero trust network access (ZTNA) is challenging, and, as workloads and clients continue to become more dynamic, the complexity of determining desired security parameters and implementing those security parameters in one or more network appliances becomes progressively more complex. As just one example, in the past, the processes related to determining and setting firewall rules could be done manually, however, to the extent such rules are still being set and maintained manually, it is only a matter of time before complexity renders such an approach impossible.

To address some of this complexity, approaches for automatically determining and setting security parameters using some level of machine learning and automation have been developed. U.S. Pat. No. 10,944,723 entitled "Systems and Methods for Managing Endpoints and Security Policies in a Networked Environment", and issued Mar. 9, 2021 describes a variety of approaches for reducing the complexity of maintaining network security at a network environment level. The entirety of the aforementioned reference is incorporated herein by reference for all purposes. Such an approach greatly enhances the ease with which a network environment may be monitored and secured.

Securing a network can be time consuming and complex. One problem with setting security features in a network is understanding where the highest risks are in the network and beginning any securing of the network with a focus on one or more high risk areas. Various embodiments discussed herein determine high risk focus areas based upon risk scores for each application, application tier, and/or workload. As these risk scores include multiple vectors like vulnerabilities, exposure, flatness of the network, live attack attempts, successful exploits and more, the scores provide guidance to prioritize segmentation and protection efforts for security teams. Without such prioritization, administrators and security teams typically may not know where to start their segmentation efforts. In case everything is segmented across every workload in a multi-cloud environment, maintaining and updating the policies can become challenging, especially if continuous changes are expected. Over-segmentation is the result of pervasively segmenting even the most benign asset. Complexities arise from that condition that make it hard to remain in that state. Without that risk score, it becomes harder to find and thwart lateral attacks as have recently been seen in SolarWinds, Microsoft Exchange, Apache Struts, VPN server hacks, RDP server breaches and more. By exposing a risky workload, it can be remediated more quickly than with traditional tools that would require the creation of segments, moving it into one of those segments and post remediation reverting it back to its original position.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The phrase "forward testing" is used in its broadest sense to be any process whereby simulation is used in relation to established rules to discern the utility and/or efficacy of such rules. Thus, as one example, forward testing may include utilizing a firewall that has established one or more network processing rules to determine whether rules in an ACL are properly operating. Such forward testing may use simulated data or actual network data depending upon the particular implementation. In such a case, the forward testing is used, for example, to test a variety of what-if scenarios, to determine what network traffic gets blocked, to determine what network traffic is allowed, and/or to determine if one of a variety of applications available in the network environment operates properly when the rules are applied.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for securing network access by automatically focusing on specific areas of a network. Such methods include: assessing, by a processing resource, at least a first risk score for a first application and a second risk score for a second application, where the first application risk score indicates a higher risk than the second application risk score; selecting, by the processing resource, the first application based in part on the first application's risk score indicating a higher risk than the second application's risk score; and securing, by the processing resource, the first application from the rest of the network.

In some instances of the aforementioned embodiments, the methods further include scoring, by the processing resource, the first application to yield the first risk score. In some such instances, the scoring of the first application includes: scoring, by the processing resource, at least a first application tier of the first application to yield a first application tier risk score and a second application tier associated with the first application to yield a second application tier risk score; and generating the first application's risk score based at least in part on the application's first tier risk score. In some cases, wherein the first tier's risk score indicates a higher risk than the second tier's risk score, the generating of the first application's risk score is based, at least in part, on the first application's first tier risk score and includes selecting the first tier's risk score.

In various instances of the aforementioned embodiments, the scoring of the first application tier includes: scoring, by the processing resource, of at least a first workload of the first application tier to yield a first workload's risk score and a second workload of the first tier to yield a second workload's risk score; and generating the first tier's risk score based at least in part on the first workload's risk score. In some such instances where the first workload's risk score indicates a higher risk than the second workload's risk score, the generating of the first tier's risk score is based at least in part on the first workload's risk score, and includes selecting the first workload's risk score.

In some instances of the aforementioned embodiments, the scoring of the first workload includes calculating the first workload risk score based upon a combination of two or more of: a common vulnerability scoring system score, a degree of network or tier flatness, a degree of exposure, a number of live attack attempts, and a number of successful exploits. In some cases, the scoring of the first workload further includes accessing, by the processing resource, a database to obtain the common vulnerability scoring system (CVSS) score.

In various instances of the aforementioned embodiments, securing the network with a focus on the first application includes: monitoring, by the processing resource, network activity to yield a set of network traffic; identifying, by the processing resource, a set of traffic packets in the set of network traffic that are either sourced from the first application or destined to the first application; and augmenting, by the processing resource, an access control list to include one or more access control rules allowing certain traffic for the set of workloads. In some instances of the aforementioned embodiments where the set of network traffic is a first set of network traffic, and the set of workloads is a first set of workloads, the methods further include: monitoring, by the processing resource, network activity to yield a second set of network traffic; identifying, by the processing resource, a second set of traffic packets in the second set of network traffic that are either sourced from any of the at least one area of network focus, or destined to any of the at least one area of network focus; identifying, by the processing resource, at least one workload in the second set of workloads that is not in the first set of workloads; and augmenting, by the processing resource, the access control list to include certain traffic for the at least one workload in the second set of workloads that is not in the first set of workloads. In one or more instances of the aforementioned embodiments, the methods further include identifying, by the processing resource, a third application associated with two or more workloads in the set of workloads, and a fourth application associated with two or more other workloads in the set of workloads. In such instances, augmenting, by the processing resource, the access control list to include one or more access control rules allowing the set of workloads is an incremental modification, and wherein the incremental modification includes: augmenting, by the processing device, the access control list to include the first access control rules corresponding to the two or more workloads associated with the third application to yield a first augmented access control list; forward testing, by the processing device, the first augmented access control list; subsequent to forward testing the first augmented access control list, augmenting, by the processing device, the first access control list to include second access control rules corresponding to the two or more workloads associated with the fourth application to yield a second augmented access control list; and forward testing, by the processing device, the second augmented access control list.

Other embodiments provide network securing systems that include: a processing resource and a non-transitory computer-readable medium coupled to the processing resource. The non-transitory computer-readable medium has stored therein instructions that, when executed by the processing resource, cause the processing resource to: access at least a first risk score for a first application and a second risk score for a second application, where the first application's risk score indicates a higher risk than the second application's risk score; select the first application based in part on the first application's risk score indicating a higher risk than the second application's risk score; and secure a network with a focus on the first application.

Yet other embodiments provide non-transitory computer-readable storage media embodying a set of instructions, which when executed by a processing resource, causes the processing resource to: access at least a first risk score for a first application and a second risk score for a second application, where the first application's risk score indicates a higher risk than the second application's risk score; select the first application based in part on the first application's risk score indicating a higher risk than the second application's risk score; and secure a network with a focus on the first application.

Turning to FIG. 1A, network architecture 100 is shown in accordance with some embodiments. In the context of network architecture 100, a network security appliance 115 controls network traffic passing to/from/within a secured network 102. Secured network 102 may be any type of communication network known in the art. Those skilled in the art will appreciate that, secured network 102 can be a wireless network, a wired network, or a combination thereof that can be implemented as one of the various types of networks, such as an Intranet, a Local Area Network (LAN), a Wide Area Network (WAN), an Internet, and the like. Further, network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

The control applied by network security appliance 115 is in part based upon a network ACL 116 that includes a number of rules indicating which types of network traffic are allowed to pass to/from/within secured network 102, and which types of traffic are to be blocked from passing to/from/within secured network 102.

As more fully described below, a security orchestration system 120 is used to monitor network traffic passing through network security appliance 115 to determine software applications that are operating in relation to secured network 102 (e.g., application A 110, application B 111, and application C 112), and workloads corresponding to operation of the respective applications. Such workloads involve communications between one or more of the applications and one or more of a database A 106, a database B 107, a database C 108, a web A 103, a web B 104, and a web C 105. Web A 103, web B 104, and web C 105 represent external network destinations.

Using this workload information, security orchestration system 120 generates access control rules for each of the identified applications, provides forward testing of the rules on an application-level granularity, and generates an ACL for secured network 102. This generated ACL is deployed by installation in place of network ACL 116. In some embodiments, security orchestration system 120 is implemented on the same hardware as network security appliance 115 making it possible to more efficiently monitor network traffic passing to/from/within secured network 102.

Figure 1B:
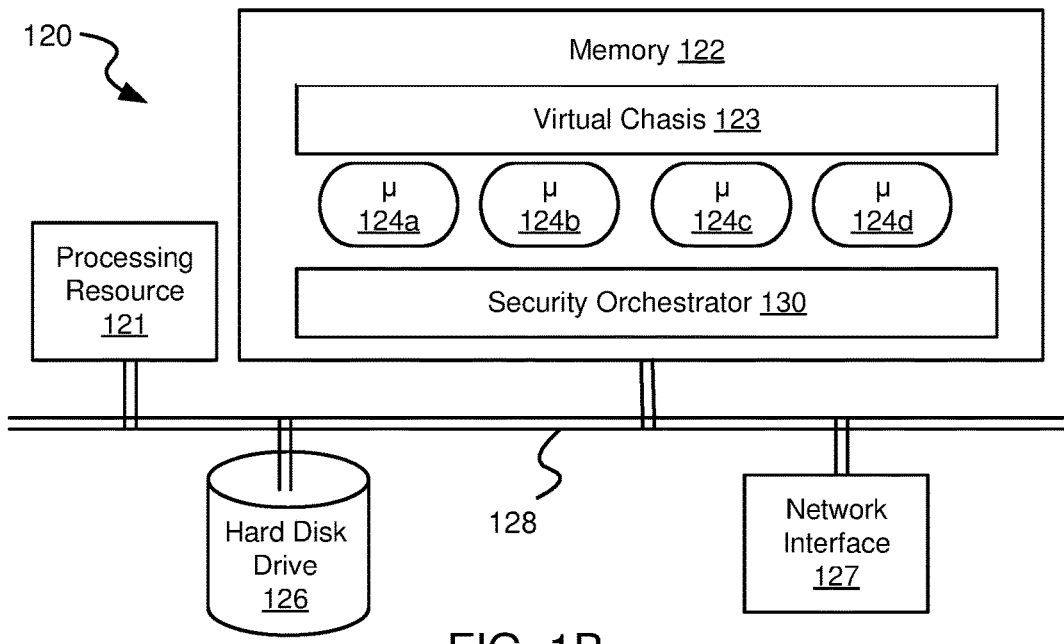

Turning to FIG. 1B, an implementation of security orchestration system 120 is shown in accordance with some embodiments. In this embodiment, security orchestration system 120 includes a processing resource 121, a memory 122, a hard disk drive 126, and a network interface 127 that are all communicably coupled via a system bus 128. Processing resource 121 may be any processors, group of processors, and/or processing circuitry that can execute instructions maintained in memory 122. Based upon the disclosure provided herein, one of ordinary skill in the art will recognize a variety processing resources that may be used in relation to different embodiments.

Memory 122 may be a volatile memory such as random-access memory (RAM), a non-volatile memory such as flash RAM, or some combination of volatile and non-volatile memory. Based upon the disclosure provided herein, one of ordinary skill in the art will recognize a variety of implementations of memory 122 that may be used in relation to different embodiments. Memory 122 stores a number of network security microservices (i.e., µ 124a, µ 124b, µ 124c, µ 124d). Such network security microservices consist of computer-executable instructions to perform one or more specific security services and are deployed based on configuration across available physical servers. In some cases, each microservice receives a configuration and tasks via a backplane of a virtual chassis 123, and returns status, statistics, and other information to the backplane.

The data processed by security orchestration system 120 is transferred from a microservice to another (hierarchically higher) microservice using a data plane. In some embodiments, during such a transfer, a lower microservice decides (based on configuration, current statistics, and other information) as to which next microservice to utilize. Such a decision may constitute a load-balancing decision to assure that the hierarchically higher microservices are efficiently utilized. In other embodiments, the decision of which microservice to utilize is made by a more central entity.

As illustrated, security orchestration system 120 utilizes processing resources 121 to execute microservices 124 and other applications (e.g., virtual chassis 123 security orchestrator 130, etc.) stored in memory 126. A network interface 127 (e.g., fabric or interconnect that is wired or wireless) provides an apparatus for communicating with other devices in a network environment. Security orchestration system 120 may inspect traffic, detect threats, perform endpoint transformation processes, generate security policies (e.g., access control lists), and otherwise protect a network environment in part by using microservices 124.

In some embodiments, security orchestrator 130 is delivered (e.g., downloaded) in the form of a seed software application. The seed software application instantiates microservices of security orchestration system 120 on a host in a network environment. As used herein, a microservice container refers to where the microservice runs, for example, on a virtual machine. Once deployed, security orchestrator 130 utilizes a processing resource 121, memory 122, and network interface 127. In some scenarios, security can be added/configured using existing hardware and/or without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, security orchestration system 120 utilizes network interface 127 to explore a network environment, discover executing software applications and corresponding workloads, determine security settings to apply to various network applications and/or workloads, and detect available hosts and hardware resources. Based on performing network environment discovery, security orchestration system 120, in some embodiments, may then offer or suggest available security tools for selection either through a graphical interface or via connections with existing enterprise management software. In one embodiment, security orchestration system 120 develops and deploys an access control list that may be used by a network security device 115 in the network environment. Indeed, in some cases, security orchestration system 120 is implemented on the same hardware (i.e., processing resources 121, memory 122, hard disk drive 126, network interface 127, and system bus 128) as the network security device 115. By virtue of the network security device 115 being "in-line" with data being received and transmitted in the network environment, the network security device 115 is able to use the access control list developed by security orchestrator 130 to allow acceptable traffic and block non-allowed traffic as part of implementing a ZTNA.

Security orchestrator 130 is configured to manage the evaluation of network traffic, determine endpoints within a networked environment, perform endpoint transformation process, and generate and deploy security policies that are executed on the transformed endpoints within the networked environment. Results of the aforementioned analysis are used by security orchestrator 130 to identify applications executing in the network environment and workloads corresponding to the identified applications.

Figure 1C:
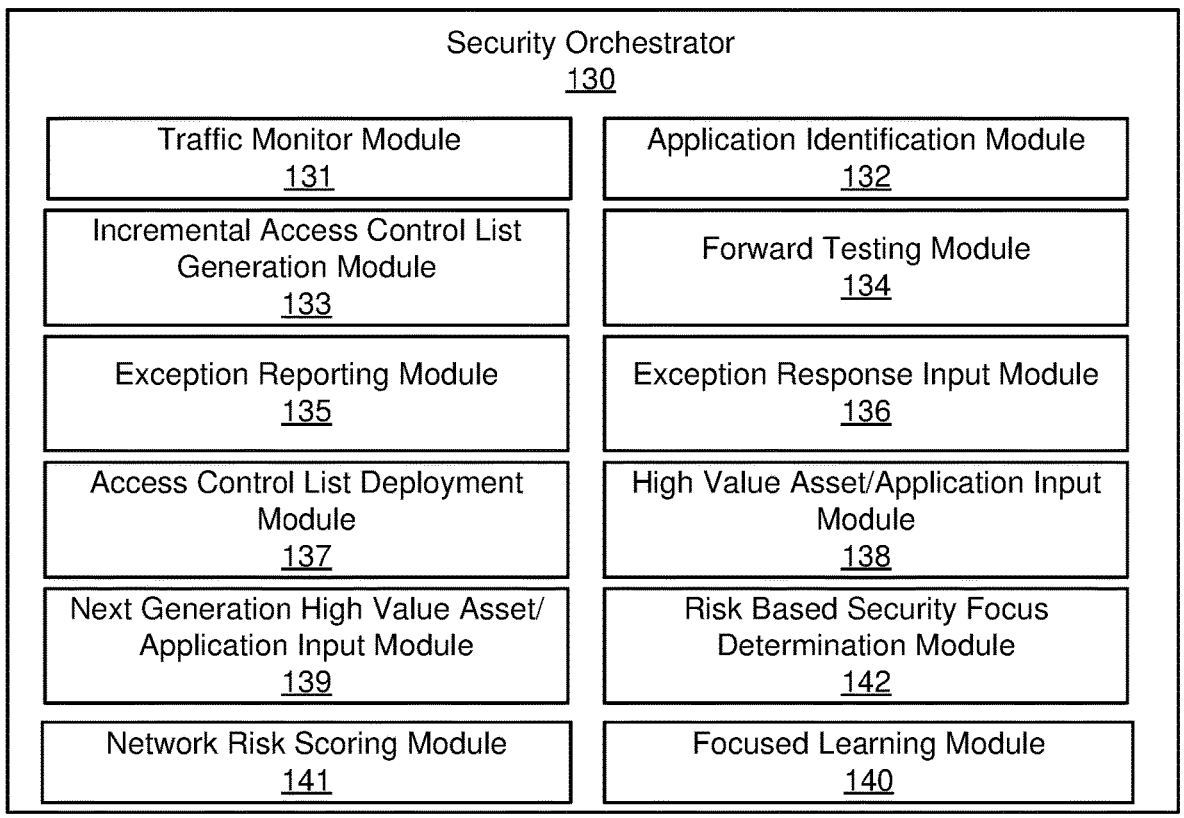

Turning to FIG. 1C, an implementation of security orchestrator 130 is shown in accordance with some embodiments. Security orchestrator 130 includes a traffic monitor module 131, an application identification module 132, an incremental access control list generation module 133, a forward testing module 134, an exception reporting module 135, an exception response input module 136, an access control list deployment module 137, a high value asset and/or application input module 138, a next generation high value asset and/or application identification module 139, a focused learning module 140, a network risk scoring module 141, and a risk-based security focus determination module 142.

Traffic monitor module 131 is configured to monitor network traffic that passes to and from secured network 102. Such traffic monitoring allows for identification of a number of traffic packets passing between various endpoints. The network traffic can be grouped into similar destinations, origins, and/or the like for analysis. In some embodiments, such network traffic monitoring may be done in accordance with that disclosed in U.S. Pat. No. 10,944,723 entitled "Systems and Methods for Managing Endpoints and Security Policies in a Networked Environment" that was previously incorporated by reference. Therein, in particular, FIGS. 6-8 and the corresponding discussion, is described one approach for monitoring network traffic that may be used in relation to some embodiments discussed herein. Such monitoring relies, at least in part, on meta information such as, for example, source and destination of the network traffic, the ports used for the network communication, the protocol used for the communication, other characteristics regarding the application communication that are derived from deep-packet inspection of the traffic.

Application identification module 132 is configured to use the network traffic identified by traffic monitor module 131 to identify applications executing within the network along with the workloads associated with the identified applications. In some embodiments, such identification of applications and corresponding workloads may be done in accordance with disclosures in U.S. Pat. No. 10,944,723 entitled "Systems and Methods for Managing Endpoints and Security Policies in a Networked Environment" that was previously incorporated by reference. Therein, in particular, FIGS. 9-11 and the corresponding discussion, is described one approach for transforming network communication metadata collected as part of a network traffic monitoring process and using the transformed metadata for network identification (e.g., classification) processes. Application identification module 132 forms a global list of all identified applications and workloads corresponding to the respective applications, and identifies all workloads in the global list as not secure. Identifying a workload as not secure may be done, for example, by setting a secure flag associated with the particular workload as false. Based upon the disclosure provided herein, one of ordinary skill in the art will recognize a variety of approaches that may be used for identifying a workload as not secure.

Incremental access control list generation module 133 is configured to incrementally incorporate access control rules for given applications into an ACL. This includes adding access control rules governing traffic to/from the workloads of an application that has been newly selected from the global list of all identified applications, to the ACL, below rules corresponding to all previously secured applications, and above the default rule. The default rule allows network traffic from any source to any destination. After forward testing for the newly updated ACL is completed and found acceptable, the ACL is again updated to indicate that the most recently selected application is considered secure and/or ZTNA compliant. The process can then be repeated for the next application which is added to the ACL after the previously secured applications and before the default rule. This process is more fully described below in relation to FIG. 2.

Forward testing module 134 is configured to deploy an interim ACL and to monitor any network traffic that is allowed to pass by the default rule. As the rules in the ACL are processed sequentially and once a network communication has been allowed or blocked by one rule, no additional rules are considered. Because the default rule is the last rule in the ACL, any network traffic that is allowed because of the default rule was not accounted for by any other rule. Such traffic is flagged by the forward testing module for consideration by a network administrator. In some cases, forward testing module 134 is configured to operate like that discussed below in relation to FIG. 5.

Exception reporting module 135 is configured to report any network traffic that is allowed under a default rule of the incrementally developing ACL. As the ACL is being forward tested after the addition of each application, only the most recently added application has not yet been fully secured. As such, any network traffic allowed because of the default rule is likely either communicating with a workload not originally identified as part of the newly added application or is some type of non-allowed network traffic. Accordingly, the report provided to the network administrator includes a relatively small amount of information compared with that which would have possibly generated if an entire ACL for a network was being forward tested at once. Further, as only one application operating in the network has not previously been fully secured (i.e., the most recently selected application), a network administrator does not have to consider every application to identify with which application the network traffic corresponds. Rather, the network administrator need only consider the most recently selected application and the possibility of a non-allowed source or destination. This greatly simplifies the processes to be performed by a network administrator tasked with developing a ZTNA policy for a network.

Exception response input module 136 is configured to accept changes to an incrementally developing ACL from a network administrator. In some embodiments, exception response input module 136 is an editing tool that allows the network administrator to make changes directly to the ACL. Based upon the disclosure provided herein, one of ordinary skill in the art will recognize a variety mechanisms and apparatus that may be used to receive changes and make modifications to an ACL in accordance with different embodiments.

Access control list deployment module 137 is configured to install the incrementally developed ACL into network security appliance 115 where it will be relied upon to control access to secured network 102. In some cases, this installation is done the same way an incrementally developing ACL is forward tested. In some embodiments, the installation is complete at the same time the last modifications to the ACL are completed and the default rule is changed to "Block", to make secured network 102 ZTNA compliant. Based upon the disclosure provided herein, one of ordinary skill in the art will recognize a variety of approaches for deploying an ACL developed in accordance with embodiments discussed herein.

High value asset and/or application input module 138 is configured to receive an indication of a high value asset(s) and/or application(s) from, for example, a user interface; and to update a focus list to include the received high value asset(s) and/or application(s). The network elements and/or workloads included in the focus list are those that will be used to focus the network traffic monitoring and formatting similar to that discussed below in relation to FIGS. 6-7.

Next generation high value asset and/or application identification module 139 is configured to identify one or more network elements from workloads touching network elements previously included in the focus list, and to update the focus list to include the identified elements. Again, the network elements included in the focus list are those that will be used to focus the network traffic monitoring and formatting like that discussed below in relation to FIGS. 6-7.

Focused learning module 140 is configured to implement a focused learning approach for developing ZTNA policy. An example of such focused learning approaches is discussed below in relation to FIGS. 6-7.

Network risk scoring module 141 is configured to score workloads, application tiers, and applications executing within secured network 102 based upon one or more risk indicators including, but not limited to, third party identified security vulnerabilities, degree of exposure, degree of flatness of secured network 102, live attack attempts directed at the scored element, and/or successful exploits of the scored element. The identified security vulnerabilities may have common vulnerability scoring system (CVSS) scores available from one or more third party databases such as an application security database 151 that maintains relative risk scores for a number of known applications. Application security database 151 may be, for example, the "National Vulnerabilities Database" available at nvd.nist.gov. Based upon the disclosure provided herein, one of ordinary skill in the art will recognize a variety of third-party databases and/or combinations thereof that may be used for the purposes of risk evaluation. The degree of exposure is a number indicating the number of objects that have access to the scored element. Thus, for example, where the scored element is accessible from anywhere on the Internet, the degree of exposure would be a relatively high number. As another example, where the scored element is only accessible to one isolated application running within secured network 102 the degree of exposure would be a relatively low number. The degree of exposure may also be determined by identifying the number of networks and/or sub-nets through which the scored element can be accessed. Based upon the disclosure provided herein, one of ordinary skill in the art will recognize a variety of ways to assign a risk number based upon the degree of exposure. The degree of flatness of the secured network is the level of tier segmentation that is used in relation to the scored element. As more substantial security monitoring is applied to processes ongoing between tiers, when compared with the level of monitoring within tiers, a scored element existing in a network with little tiered segmentation will have a risk score that is greater than that of a scored element existing in a network with high degree of tiered segmentation. Based upon the disclosure provided herein, one of ordinary skill in the art will recognize a variety of ways to assign a risk number based upon the degrees of flatness. The live attack attempts are assembled by a network monitor operating on secured network 102 that identifies indicators of compromises of different scored elements and maintains a list of the compromises in a database. Such live attack attempts on a given workload may include, but are not limited to, malware events, uniform record locator (URL) events, data detection events, indicators of attack (IOA) events, results of a vulnerability scan, and/or infrastructure layout. Based upon the disclosure provided herein, one of ordinary skill in the art will recognize a variety of ways to assign a risk number based upon the live attack attempts. The successful exploits are assembled by a network monitor operating on secured network 102 that identifies successful breaches of security via the score element. Based upon the disclosure provided herein, one of ordinary skill in the art will recognize a variety of ways to assign a risk number based upon the successful exploits. Network risk scoring module 141 may perform various of the functions discussed below in relation to FIG. 9B.

Risk based security focus determination module 142 is configured to identify a network element exhibiting the highest risk based at least in part on the security scores generated by network risk scoring module 141. In some embodiments, the identified network element is an application. In other embodiments, the network element is a tier of an application. In yet other embodiments, the network element is a workload. The identified network element is provided to high value asset and/or application input module 138 where it is used as a focus of network security like that discussed below in relation to FIG. 7. Risk based security focus module 142 may perform various of the functions discussed below in relation to FIG. 9A.

Figure 1D:
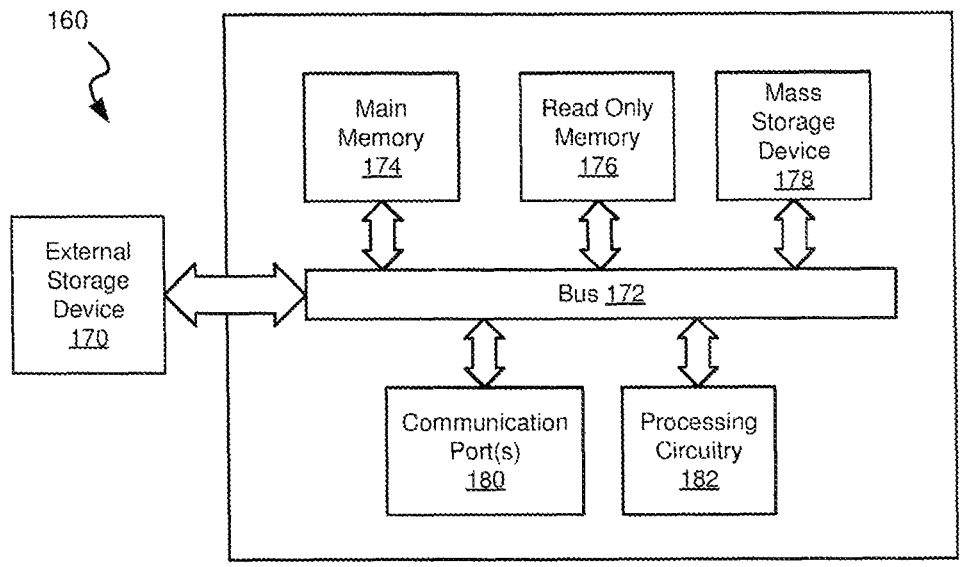

Turning to FIG. 1D, an example computer system 160 is shown in which or with which embodiments of the present disclosure may be utilized. As shown in FIG. 1B, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of security orchestration system 120, network security appliance 115, one or more computers on which application A 110, application B 111, and/or application C 112 are executing, and/or one or more network servers governing database A 106, database B 107, and/or database C 108.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25 G, 40 G, and 100 G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 1E:
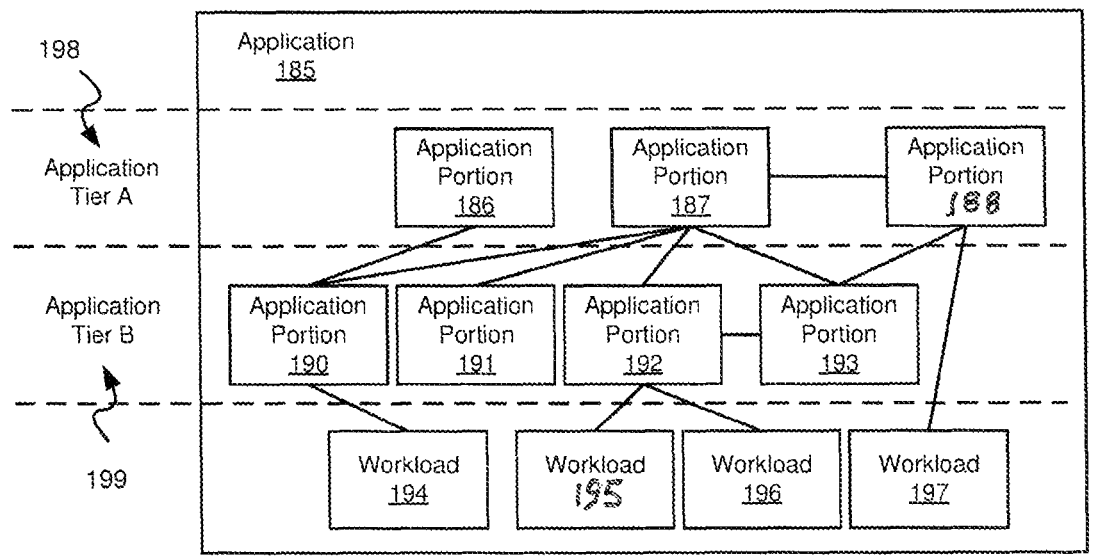

Turning to FIG. 1E, an example application 185 is shown that has two application tiers 198, 199 that each include a number of application portions (i.e., an application portion 186, an application portion 187, and an application portion 188 on an application tier 198; and an application portion 190, an application portion 191, and an application portion 192, and an application portion 193 on an application tier 199. Application 185 may represent any application executing within secured network 102 including, but not limited to, application A 110, application B 111, and/or application C 112. Application portions 186-193 may interact with one another as shown by the connecting lines between the respective application portions. As a general rule, security for communications between application portions across application tiers is stronger than security for communications between application portions within the same application tier. One or more workloads 194-197 may be spawned from one or more of the application portions as indicated by the connecting lines. It is noted that example application 185 is merely for illustration purposes and that many different applications and application architectures including more or less application tiers and/or more or less application portions may be processed in accordance with different embodiments discussed herein.

Figure 2:
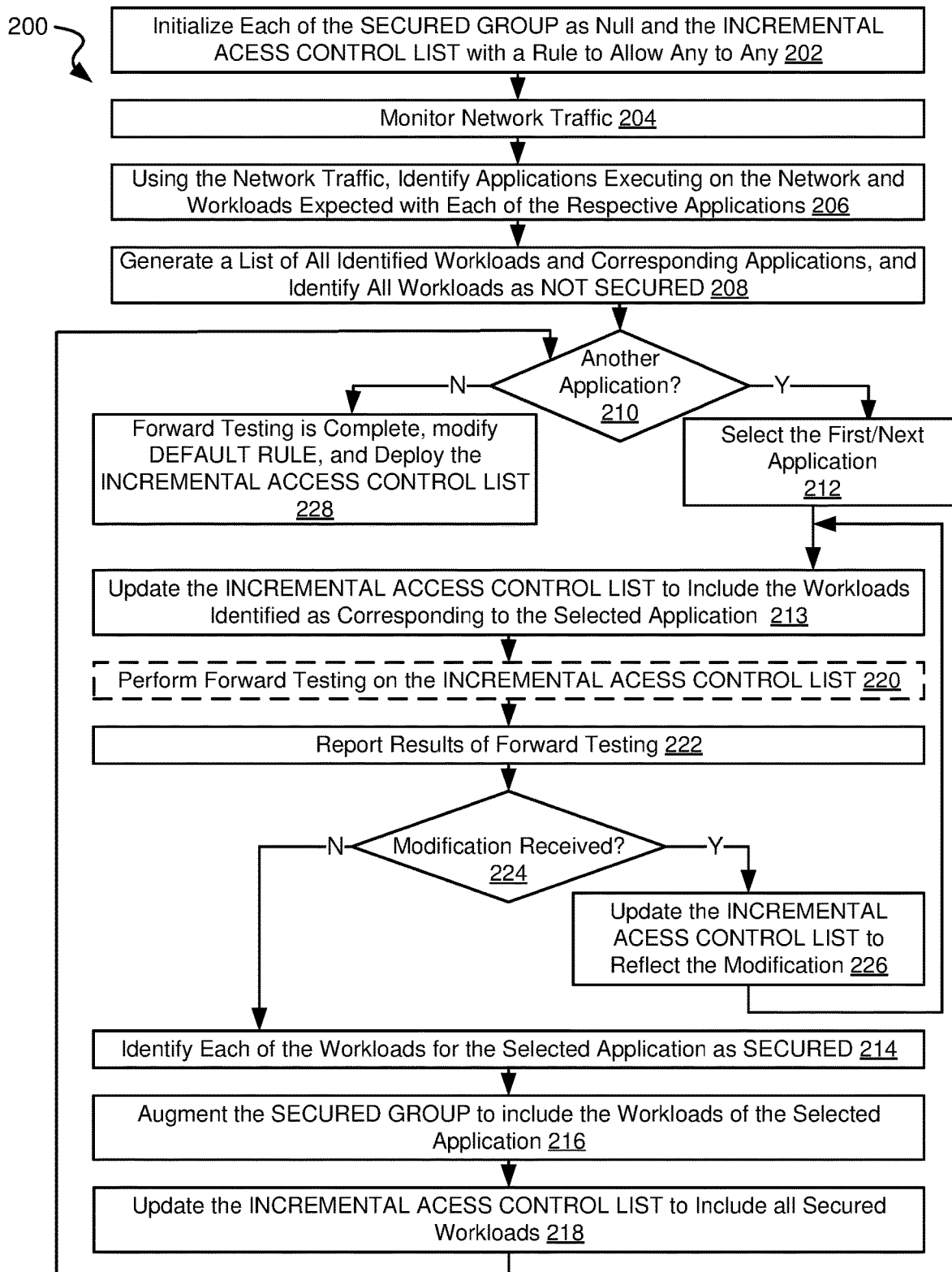
FIG. 2 is a flow diagram showing a method in accordance with various embodiments for performing forward testing at an application level granularity.
Figure 3:
FIG. 3 is a graphical representation of an example access control list designed for zero trust network access in a network environment with a single application.

Turning to FIG. 2, a flow diagram 200 shows a method in accordance with various embodiments for performing forward testing at an application level granularity. In particular flow diagram 200 shows a method that includes developing a multi-application ACL that is forward tested at an application level. To aid in understanding the multi-application ACL developed using the method of FIG. 2, FIG. 3 graphically represents an example ACL 300 designed for zero trust network access in a network environment with a single application, but is not designed to accommodate application level forward testing. As shown, ACL 300 includes four rules—three (Rule 1, Rule 2, and Rule 3) of which are designed specifically for an Application A and to allow access to a web from a secured network, and one (Rule 4) of which is a default rule that serves to block all other traffic. In particular, Rule 1 allows any traffic from the secured network to pass to a web using transmission control protocol (TCP) on port 80, Rule 2 allows traffic from the web to Application A using TCP via port 443, and Rule 3 allows traffic from Application A to a database using TCP via port 3016. Rule 4 blocks all traffic that does not qualify under one of Rule 1, Rule 2, or Rule 3.

In operation, each of the rules of ACL 300 are applied in order. Thus, when traffic is received, it is determined if it qualifies under Rule 1 (i.e., is traffic from the secured network to the Web A tier). If the traffic qualifies, it is allowed and none of Rules 2-4 are considered. Alternatively, where the traffic does not qualify under Rule 1, qualification under Rule 2 (i.e., is the traffic from the Web A to Application A) is considered. If the traffic qualifies under Rule 2, it is allowed and none of Rules 3-4 are considered. Alternatively, where the traffic does not qualify under Rule 2, qualification under Rule 3 (i.e., is the traffic from Application A to the Database A) is considered. If the traffic qualifies under Rule 3, it is allowed, and Rule 4 is not considered. Alternatively, the traffic is blocked under Rule 4. This default blockage effectively enforces ZTNA by disallowing all unidentified traffic.

While ACL 300 governs workloads from only a single application (i.e., Application A), one of ordinary skill in the art will appreciate that ACL 300 can be modified to include a large number of rules governing workloads associated with a number of applications over which the ACL has oversight (i.e., applications running on a secured network governed by the ACL). Such modification would include the addition of rules corresponding to the additional workloads, tiers and/or applications between Rule 3 and Rule 4. The default traffic blocking rule is the last rule in the modified ACL to assure ZTNA compliance. Such a modified ACL, however, requires forward testing of all rules at once and does not provide for testing at an application-level granularity.

Figure 4A:
FIGS. 4A-4F graphically represent generation of an access control list using forward testing at an application granularity and providing zero trust network access for a network environment running a number of applications in accordance with some embodiments.

Returning again to FIG. 2, an ACL is generated that is forward tested at an application-level granularity. Following flow diagram 200, a SECURED GROUP set to null and an INCREMENTAL ACCESS CONTROL LIST are initialized to include a single rule (i.e., a default rule) to allow network traffic from any source to any destination (block 202). Turning to FIG. 4A, a graphical representation of a newly initialized incremental ACL 400 is shown that includes only a single rule (i.e., Rule 1) that allows network traffic from any source to any destination. Where such an ACL is used, for example in a network firewall relying on the ACL, no traffic would be blocked.

Returning to FIG. 2, network traffic is monitored that passes to, from and within the network to be supported by the ACL developed using the method of FIG. 2 (block 204). Such traffic monitoring allows for identification of a number of traffic packets passing between various endpoints This network traffic can be grouped into similar destinations, origins, and/or the like for analysis. In some embodiments, such network traffic monitoring may be done in accordance with that disclosed in U.S. Pat. No. 10,944,723 entitled "Systems and Methods for Managing Endpoints and Security Policies in a Networked Environment" that was previously incorporated by reference. In particular, FIGS. 6-8 and the corresponding discussion in the aforementioned incorporated reference describe one approach for monitoring network traffic that may be used in relation to some embodiments discussed herein. Such monitoring relies, at least in part, on meta information such as, for example, source and destination of the network traffic, the ports used for the network communication, the protocol used for the communication, other characteristics regarding the application communication that are derived from deep-packet inspection of the traffic.

Using the network traffic identified in the monitoring process (block 204), applications executing within the network along with the workloads associated with the applications are identified (block 206). In some embodiments, such identification of applications and corresponding workloads may be done in accordance with that disclosed in U.S. Pat. No. 10,944,723 entitled "Systems and Methods for Managing Endpoints and Security Policies in a Networked Environment" that was previously incorporated by reference. In particular, FIGS. 9-11 and the corresponding discussion in the aforementioned incorporated reference describe one approach for transforming network communication metadata collected as part of a network traffic monitoring process and using the transformed metadata for network identification (e.g., classification) processes.

A global list of all identified applications and workloads corresponding to the respective applications is assembled (block 208). All workloads in the global list are identified as not secured. Identifying a workload as not secure may be done, for example, by setting a secure flag associated with the particular workload as false. Based upon the disclosure provided herein, one of ordinary skill in the art will recognize a variety of approaches that may be used for identifying a workload as not secure.

Figure 4B:

It is determined whether any applications remain in the global list that have not yet been processed for incorporation into the INCREMENTAL ACCESS CONTROL LIST (block 210). Where one or more applications remain for processing (block 210), the first/next application in the global list is selected (block 212), and the INCREMENTAL ACCESS CONTROL LIST is updated to include all workloads and network traffic identified as corresponding to the selected application (block 213). Turning to FIG. 4B, a graphical representation of an incremental ACL 410 is shown after adding a first selected application (i.e., Application A) that includes three identified tiers (traffic to a Web A, traffic from Web A to Application A, and traffic from Application A to Database A). The three workload tier/groups associated with the first selected application occupy the first three rules (Rule 1, Rule 2, and Rule 3), and the default rule is moved to the last rule (Rule 4). While incremental ACL 410 is shown with Application A having three workload tier/groups, one of ordinary skill in the art will recognize that a different application may exhibit fewer or more identified workloads, and that the identified workloads for the application may be different and include network traffic directed between different network endpoints.

Returning to FIG. 2, forward testing is applied using the INCREMENTAL ACCESS CONTROL LIST (block 220). This block is shown in dashed lines as detail of this block is set forth in FIG. 5 below. During forward testing, any network traffic that is allowed because of the default rule (i.e., any network traffic not allowed by a rule specific to a workload of a particular application) is flagged.

The flagged network traffic is reported to, for example, a network administrator as forward testing results (block 222). As only the most recently selected application (i.e., Application A in the case of incremental ACL 410, FIG. 4B, or Application B in the case of incremental ACL 430, FIG. 4D) has not yet been fully secured, any network traffic allowed because of the default rule is likely either communicating with a workload not originally identified as part of the newly selected application or is some type of non-allowed network traffic. Accordingly, the report provided to the network administrator includes a relatively small amount of information compared with that which would have possibly generated if an entire ACL for a network was being forward tested at once. Further, as only one application operating in the network has not previously been fully secured (i.e., the most recently selected application), a network administrator does not have to consider every application to identify to which application the network traffic corresponds. Rather, the network administrator need only consider the most recently selected application and the possibility of a non-allowed source or destination. This greatly simplifies the processes to be performed by a network administrator tasked with developing a ZTNA policy for a network. Based upon the disclosure provided herein, one of ordinary skill in the art will recognize a variety of other advantages that may be achieved in accordance with embodiments discussed herein, and a variety of reports that may be produced and provided based upon the forward testing applied to the INCREMENTAL ACCESS CONTROL LIST.

It is determined whether a network administrator reviewing the reported results of forward testing has indicated a desired change to the rules in the INCREMENTAL ACCESS CONTROL LIST (block 224). Where a change is indicated (block 224), the INCREMENTAL ACCESS CONTROL LIST is modified to reflect the received change request (block 226) and the processes of blocks 220-224 are repeated for the updated INCREMENTAL ACCESS CONTROL LIST. The changes should be limited to the rules corresponding to the most recently selected application. Based upon the disclosure provided herein, one of ordinary skill in the art will recognize a variety of approaches that may be used in relation to different embodiments for a network administrator to indicate a change. As one example, a network administrator may simply edit the INCREMENTAL ACCESS CONTROL LIST to make a desired change.

Alternatively where no changes are indicated (block 224), the most recently selected application is considered compliant with a ZTNA policy. In such a situation, each of the workloads associated with the most recently selected application are identified as secure (block 214). Identifying a workload as secure may be done, for example, by setting a secure flag associated with the particular workload as true. Based upon the disclosure provided herein, one of ordinary skill in the art will recognize a variety of approaches that may be used for identifying a workload as secure.

Further, the SECURED GROUP is augmented to include all of the workloads that were newly identified as secured (block 216). For the first selected application, such augmenting of the SECURED GROUP includes adding the workloads for the most recently selected application to an otherwise empty group. In contrast, for the second and later applications that are being processed, augmenting the SECURED GROUP will include adding the workloads newly identified as secured to those previously included in the SECURED GROUP.

Additionally the INCREMENTAL ACCESS CONTROL LIST is updated to include all secure workloads (block 218). This includes setting forth rules specifically allowing traffic of each workload corresponding to the selected application, and rules general to the SECURED GROUP. The rules general to the SECURED GROUP are two: (1) blocking traffic from any source to any destination included in the SECURED GROUP using any protocol or port, and (2) blocking traffic from any source included in the SECURED GROUP to any destination using any protocol or port.

Figure 4C:

Turning to FIG. 4C, a graphical representation of an incremental access control list 420 is shown that includes a single application (i.e., Application A) that includes three identified workload tiers/groups (traffic to a Web A, traffic from Web A to Application A, and traffic from Application A to Database A) that is considered compliant with a ZTNA policy. Two rules are added to incremental access control list 410: a rule (i.e., Rule 4) blocking any traffic from the SECURED GROUP to any destination, and a rule (i.e., Rule 5) blocking any traffic from any source to the SECURED GROUP. As the rules are processed in order, any traffic allowed for Application A will have been processed under Rule 1, Rule 2, or Rule 3, and any other traffic associated with Application A will be blocked under Rule 4 or Rule 5. All other traffic unrelated to Application A will be allowed under the default rule (Rule 6).

Figure 4D:

Returning to FIG. 2, after updating the INCREMENTAL ACCESS CONTROL LIST to reflect all rules related to the most recently selected application (blocks 214-218), it is determined whether another application remains in the global list that has not yet been processed for incorporation into the INCREMENTAL ACCESS CONTROL LIST (block 210).

Where one or more applications remain for processing (block 210), the next application in the global list is selected (block 212), and the INCREMENTAL ACCESS CONTROL LIST is updated to include all workloads identified as corresponding to the selected application (block 213). Updating the INCREMENTAL ACCESS CONTROL LIST includes adding rules prior to the default rule, where the added rules are specific to each of the identified workloads and specifically allow network traffic associated with the identified workloads. Turning to FIG. 4D, a graphical representation of an incremental ACL 430 is shown after adding a second selected application (i.e., Application B) that includes three identified workload tiers/groups (traffic to a web B, traffic from web B to Application B, and traffic from Application B to Database B). The three workload tiers/groups associated with the second selected application occupy the three rules immediately prior to the default rule (Rule 6, Rule 7, and Rule 8), and the default rule is moved to the last rule (Rule 9). While incremental ACL 430 is shown with Application B having three workload tier/groups, one of ordinary skill in the art will recognize that a different application may exhibit fewer or more identified workload tier/groups, and that the identified workloads for the application may be different and include network traffic directed between different network endpoints.

Returning to FIG. 2, forward testing is applied using the newly updated INCREMENTAL ACCESS CONTROL LIST (block 220). Again, during forward testing any network traffic that is allowed because of the default rule (i.e., any network traffic not allowed by a rule specific to a workload of a particular application) is flagged.

The flagged network traffic is reported to the network administrator as forward testing results (block 222). As only the most recently selected application has not yet been fully secured, any network traffic allowed because of the default rule is likely either communicating with a workload not originally identified as part of the newly selected application or is some type of non-allowed network traffic. In the case of forward testing incremental ACL 430, any network traffic allowed because of the default rule is likely either communicating with a workload not originally identified as part of Application B or is some type of non-allowed network traffic. Traffic corresponding to Application A should not occur as it was secured during a prior pass through blocks 220, 222, 226, 214, 216, 218. Again, this greatly reduces the complexity faced by a network administrator tasked with developing a ZTNA policy for a network.

It is determined whether a network administrator reviewing the reported results of forward testing has indicated a desired change to the rules in the INCREMENTAL ACCESS CONTROL LIST (block 224). Where a change is indicated (block 224), the INCREMENTAL ACCESS CONTROL LIST is modified to reflect the received change request (block 226) and the processes of blocks 220-224 are repeated for the updated INCREMENTAL ACCESS CONTROL LIST. Again, the changes should be limited to the rules corresponding to the most recently selected application.

Alternatively where no changes are indicated (block 224), the most recently selected application (e.g., Application B in the case of incremental ACL 430) is considered compliant with the ZTNA policy. In such a situation, each of the workloads associated with the most recently selected application are identified as secure (block 214). Identifying a workload as secure may be done, for example, by setting a secure flag associated with the particular workload as true. Based upon the disclosure provided herein, one of ordinary skill in the art will recognize a variety of approaches that may be used for identifying a workload as secure.

Further, the SECURED GROUP is augmented to include all of the workloads that were newly identified as secured (block 216). Again, for the second and later applications that are being processed, augmenting the SECURED GROUP will include adding the workloads newly identified as secured to those previously included in the SECURED GROUP.

Additionally the INCREMENTAL ACCESS CONTROL LIST is updated to include all secure workloads (block 218). This includes setting forth rules specifically allowing traffic of each workload corresponding to the selected application, and rules general to the SECURED GROUP. The rules general to the SECURED GROUP are two: (1) blocking traffic from any source to any destination included in the SECURED GROUP using any protocol or port, and (2) blocking traffic from any source included in the SECURED GROUP to any destination using any protocol or port. These general rules are moved to the two rules immediately preceding the default rule in the INCREMENTAL ACCESS CONTROL LIST.

Figure 4E:

Turning to FIG. 4E, a graphical representation of an incremental access control list 440 is shown that includes two applications (i.e., Application A and Application B) that each includes three identified workload tier/groups (traffic to a Web A, traffic from Web A to Application A, and traffic from Application A to Database A; and traffic to a Web B, traffic from Web B to Application B, and traffic from Application B to Database B) that are considered compliant with a ZTNA policy. The rules corresponding to the recently updated SECURED GROUP are included as Rule 7 and Rule 8 are included immediately prior to the default rule (i.e., Rule 9). As the rules are processed in order, any traffic allowed for Application A will have been processed under Rule 1, Rule 2, or Rule 3; any traffic allowed for Application B will have been processed under Rule 4, Rule 5, or Rule 6; and any other traffic associated with either Application A or Application B will be blocked under Rule 7 or Rule 8. All other traffic unrelated to either Application A or Application B will be allowed under the default rule (Rule 9).

Figure 4F:

Returning to FIG. 2, after updating the INCREMENTAL ACCESS CONTROL LIST to reflect all rules related to the most recently selected application (blocks 214-218), it is determined whether another application remains in the global list that have not yet been processed for incorporation into the INCREMENTAL ACCESS CONTROL LIST (block 210). Once no additional applications remain for processing in the global list (block 210), forward testing is complete (block 228). The default rule is modified from "Allow" to "Block" to enforce ZTNA and the INCREMENTAL ACCESS CONTROL LIST is deployed. Such deployment may be as simple as beginning operation of the network where a network security appliance uses the INCREMENTAL ACCESS CONTROL LIST to control what network traffic is allowed to pass to and from a secured network. Turning to FIG. 4F, a graphical representation is shown of an incremental access control list 450 that is incremental ACL 440 where the default rule (i.e., Rule 9) is changed from "Allow" to "Block" in accordance with the process of block 228 of FIG. 2.

While the examples in FIGS. 4A-4F show an incremental ACL developed with two applications, one of ordinary skill in the art will recognize that the processes of FIG. 2 may be repeated for any number of applications to be operated in a network environment. Further, while the applications shown in the examples in FIGS. 4A-4F each include the same number and types of workloads, one of ordinary skill in the art will appreciate other types of applications will include different types and numbers of workloads, and may be handled as discussed above in relation to FIG. 2.

Figure 5:
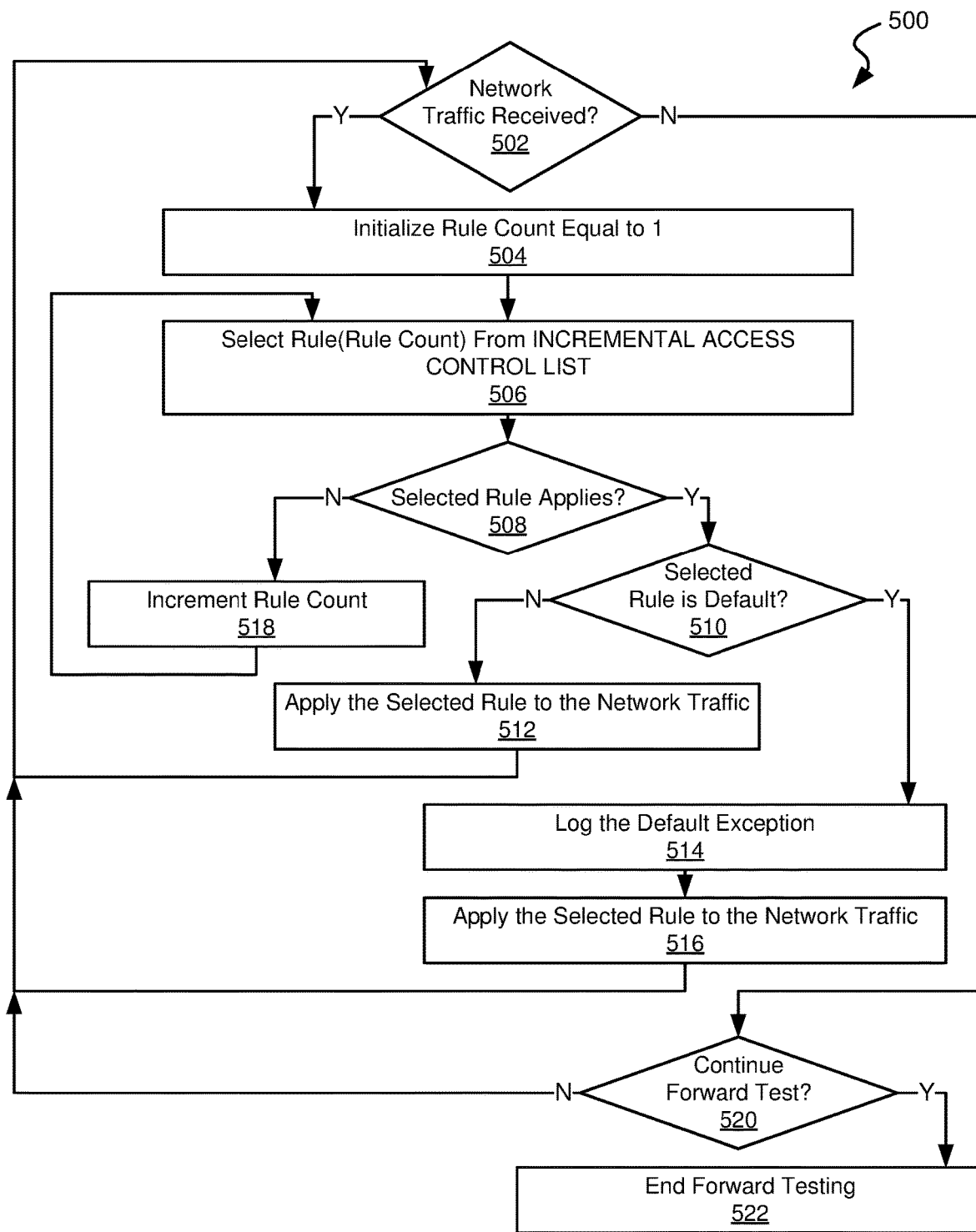
FIG. 5 is a flow diagram showing a method in accordance with various embodiments for forward testing an access control list on an application granularity.

Turning to FIG. 5, a flow diagram 500 shows a method in accordance with some embodiments for forward testing an ACL on an application granularity. Following flow diagram 500, it is determined if a network traffic communication has been received (block 502). A network traffic communication is received any time an attempt is made to access an endpoint outside of a secured network from within the secured network or any time an attempt is made to access an endpoint within the secured network from beyond the secured network. Based upon the disclosure provided herein, one of ordinary skill in the art will recognize a variety of network traffic that may be identified in relation to the operations of flow diagram 500.

Periodically, it is determined whether a timeout condition has been met (block 520). Such a timeout condition may be a certain time or may be a certain number of received network traffic communications. Based upon the disclosure provided herein, one of ordinary skill in the art will recognize a variety of timeout conditions that may be used. Where the timeout condition has not been met (block 520), processing is returned to await the next network traffic. Alternatively, where the timeout condition has been met (block 520), forward testing is ended (block 522) leaving the logged default exceptions.

Where network traffic has been received (block 502), a rule count is initialized at "1" (block 504) and the rule corresponding to the rule count (in this case Rule 1) is selected from the INCREMENTAL ACCESS CONTROL LIST (block 506). It is determined whether the selected rule applies to the received traffic (block 508). Using ACL 420 of FIG. 4C as a specific example, it is determined whether the network traffic is destined for Web A using TCP via port 80.

Where the selected Rule applies to the received network traffic (block 508), it is determined whether the selected rule is the default rule for the INCREMENTAL ACCESS CONTROL LIST (i.e., the last rule in the ACL) (block 510). Where it is not the default rule (block 510), the selected rule is applied (block 512), and the process returns to block 502 to await the next network traffic. Thus, using the example of FIG. 4C, where the selected rule is Rule 1 and the destination of the network traffic is to Web A, the traffic is allowed and processing is returned to await the next network traffic.

Alternatively, where the selected rule is the default rule (block 510), a default exception is logged (block 514). Such a default exception indicates that network traffic was received that was not properly handled by any of the preceding rules in the INCREMENTAL ACCESS CONTROL LIST. The default rule is applied to the network traffic (block 516) and the process returns to block 502 to await the next network traffic. Using the example of FIG. 4C, where the selected rule is the default rule (i.e., Rule 6) the network traffic is allowed and processing is returned to await the next network traffic.

Alternatively, where the selected rule does not apply to the received network traffic (block 508), the rule count is incremented (block 518) and the rule indicated by the rule count is selected (block 506) before the processes of blocks 508-518 are repeated for the next rule. This process of sequencing through the rules in the INCREMENTAL ACCESS CONTROL LIST continues until rule count is incremented to the default rule, and the processes of blocks 510-518 are followed for the default rule.

If the INCREMENTAL ACCESS CONTROL LIST is correct, the default exceptions will not include any network traffic related to the first application. Rather, all of the default traffic will be either undesired or germane to another application. As discussed in relation to FIG. 2 above, where the default traffic includes traffic germane to the most recently selected application (in the case of FIG. 4C this would be Application A; and in the case of FIG. 4D this would be Application B) an administrator would see this and modify the INCREMENTAL ACCESS CONTROL LIST to accommodate the network traffic improperly handled under the default rule. As such, by the time forward testing of the INCREMENTAL ACCESS CONTROL LIST including only the first selected application is complete, rules specific to the first selected application have been forward tested and validated. Again using FIG. 4C as an example, this would mean that Rule 1, Rule 2, and Rule 3 of ACL 420 would be validated.

At this juncture, the next pass through the forward testing process of flow diagram 500 would test the INCREMENTAL ACCESS CONTROL LIST after adding workloads for the next application. Because the rules specific to the prior selected application are already validated, any consideration of network traffic processed by the default rule need only be considered from the perspective of the rules germane to the workloads specific to the newly selected application. Thus, using FIG. 4E as an example, any default exceptions logged when forward testing using ACL 440 are considered only in light of Rule 4, Rule 5, and Rule 6 that are specific to the Application B. The same is true for ACL 420 where all of Rule 1, Rule 2, Rule 3, Rule 4, Rule 5, Rule 6 were verified and validated in prior forward testing of ACL 400 and ACL 410, leaving only Rule 7, Rule 8, and Rule 9 that are specific to the Application C for verification and validation. As mentioned above, by performing forward testing at an application granularity, the validity of only a small number of rules of an overall ACL need be considered at a given time.

Figure 6A:
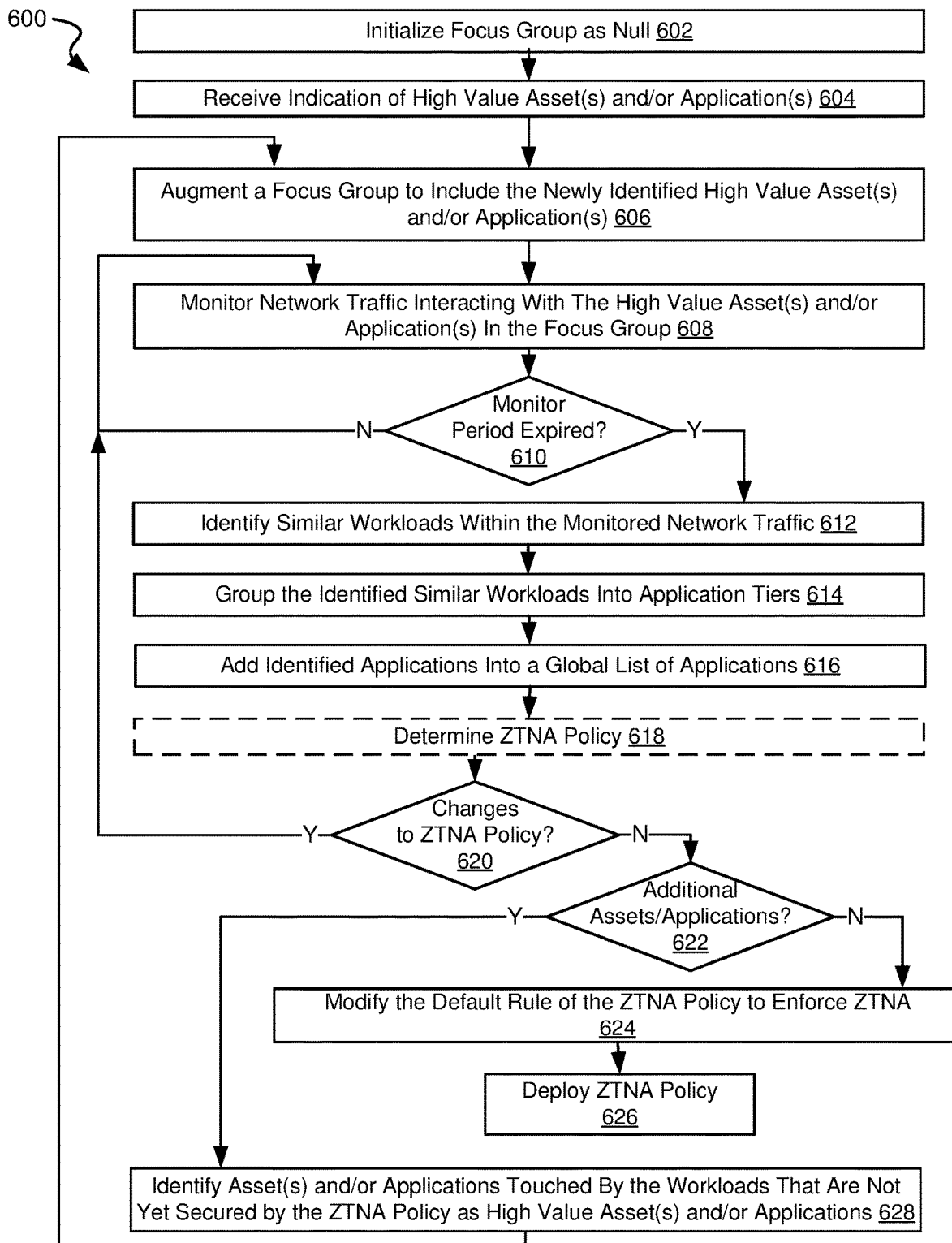
FIGS. 6A-6B are flow diagrams showing a method in accordance with some embodiments for developing a zero trust network access from the perspective of one or more identified network elements.
Figure 6B:
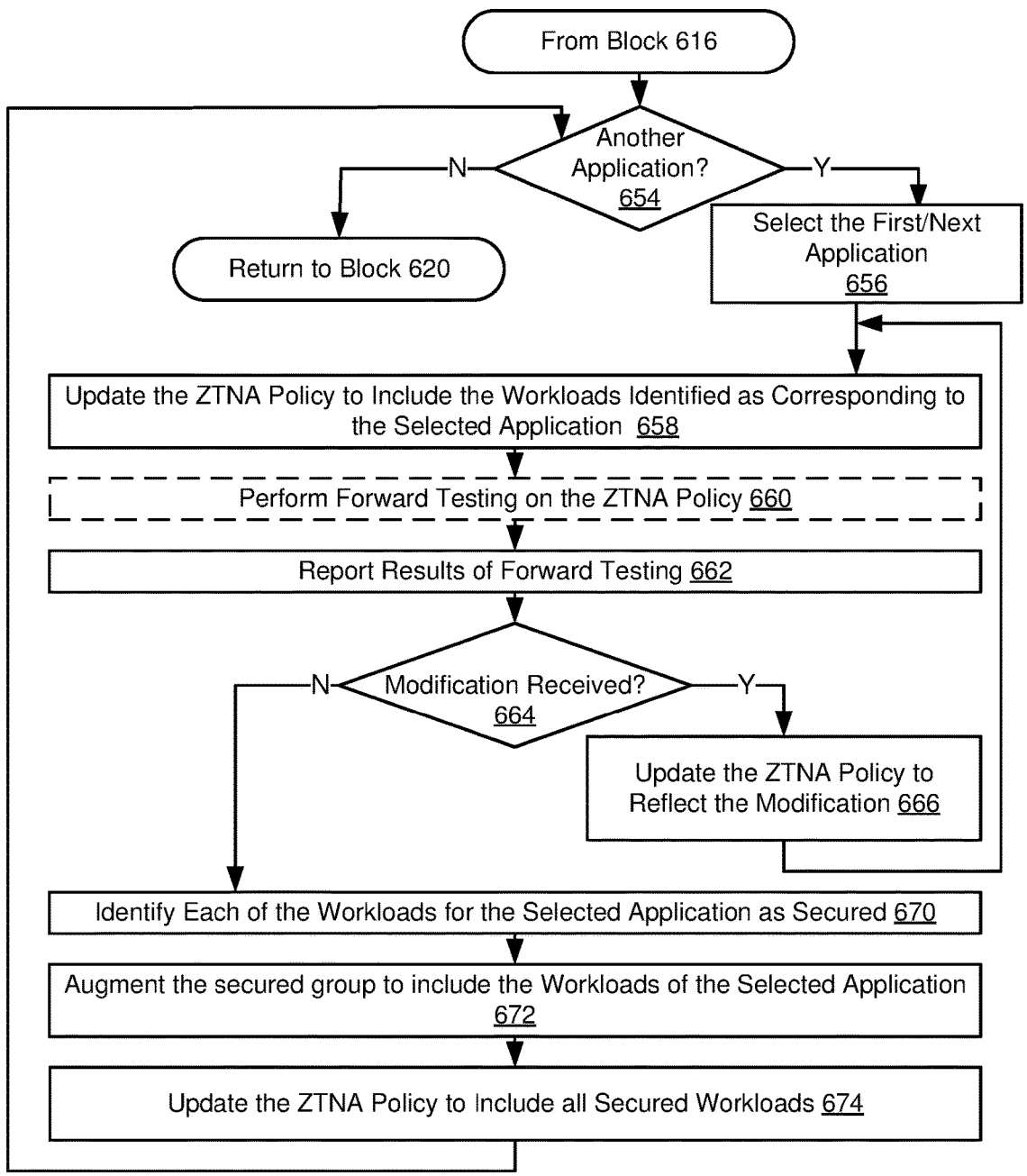

Turning to FIGS. 6A-B, flow diagram 600 and flow diagram 616 show a method in accordance with some embodiments for developing a zero trust network access from the perspective of one or more identified network elements. Turning specifically to FIG. 6A and following flow diagram 600, a focus group is initialized as null (block 602), and an indication of a high value asset(s) and/or application(s) is received (block 604). The high value asset(s) and/or applications may be identified, for example, by a network administrator reviewing a physical asset map of a network and selecting one or more of the assets and/or applications operating in the network as a focus for a machine learning module responsible for identifying workloads and determining applications to which the workloads belong. As an example, the network administrator may identify a particular network database as a high value asset. The identified high value asset(s) and/or application(s) are then provided as an input. Based upon the disclosure provided herein, one of ordinary skill in the art will recognize a variety of high value asset(s) and/or application(s) that may be selected in accordance with different embodiments, and a number of mechanisms that may be used to identify the selected high value asset(s) and/or application(s) for processing.

The focus group is augmented to include the newly identified high value asset(s) and/or application(s) (block 606). This focus group becomes the focus of the identification of workloads and applications to be secured.

Network traffic is monitored that is either transmitted to or received from one of the high value asset(s) and/or application(s) included in the focus group (block 608). Such traffic monitoring allows for identification of a number of workloads directly touching the specifically identified network elements. By focusing the monitoring on those network elements specifically identified in the focus group, only a subset of the overall network traffic is considered for grouping into similar destinations, origins, and/or the like for analysis. In some embodiments, such network traffic monitoring may be done in accordance with that disclosed in U.S. Pat. No. 10,944,723 entitled "Systems and Methods for Managing Endpoints and Security Policies in a Networked Environment" that was previously incorporated by reference. In particular, FIGS. 6-8 and the corresponding discussion in the aforementioned incorporated reference describe one approach for monitoring network traffic that may be used in relation to some embodiments discussed herein. Such monitoring relies, at least in part, on meta information such as, for example, source and destination of the network traffic, the ports used for the network communication, the protocol used for the communication, other characteristics regarding the application communication that are derived from deep-packet inspection of the traffic.

This process of monitoring (block 608) is continued for a defined period (block 610). The defined period may be fixed or user programmable. In some cases, the defined period is set to allow for a sufficient number of network transactions to occur such that multiple instances of workloads associated with applications may be identified, and thus facilitate the automated identification of assets and corresponding workloads within the network environment.

Once the monitoring period has expired (block 610), similarly behaving workloads within the monitored network traffic are identified (block 612). The similarity of the workloads may be identified based upon any number of commonalities in metadata about the workloads' traffic. For example, all traffic packets from a particular endpoint or to a particular endpoint may be used to group the endpoints. As another example, all traffic packets from a particular endpoint on a particular port may be used to determine the endpoint's group. As yet another example, all traffic packets to a particular endpoint and having an attached file may be used to determine the endpoint's group. Based upon the disclosure provided herein, one of ordinary skill in the art will recognize a variety of bases upon which workloads may be considered similar to other workloads, and grouped together as similar workloads.

The similar workloads are grouped together into application tiers based upon which application with which they are associated (block 614). In some embodiments, such identification of applications and corresponding workloads may be done in accordance with that disclosed in U.S. Pat. No. 10,944,723 entitled "Systems and Methods for Managing Endpoints and Security Policies in a Networked Environment" that was previously incorporated by reference. In particular, FIGS. 9-11 and the corresponding discussion in the aforementioned incorporated reference describe one approach for transforming network communication metadata collected as part of a network traffic monitoring process, and using the transformed metadata for network identification (e.g., classification) processes. As just one example, the workloads for an application may be identified in three tiers (i.e., a web tier, an application tier, and a database tier) similar to that shown for Application A of ACL 410 of FIG. 4B.

A global list of all identified applications and workloads corresponding to the respective applications is assembled (block 616). All workloads in the global list are identified as not secured. Identifying a workload as not secure may be done, for example, by setting a secure flag associated with the particular workload as false. Based upon the disclosure provided herein, one of ordinary skill in the art will recognize a variety of approaches that may be used for identifying a workload as not secure.

A ZTNA policy is then determined for the workloads in the global list (block 618). In some cases, forming the ZTNA policy may be done by a network administrator manually defining an ACL indicating that one or more of the identified workloads are allowable. Such an ACL may be similar to, for example, ACL 300 of FIG. 3 that secures a database that is accessed by a single application. While ACL 300 is shown as including one database accessed by a single application (Application A), it is noted that the ACL created by the network administrator may include several network assets and/or network applications.

In other cases, forming the ZTNA policy may be done automatically using a process similar to that shown in flow diagram 618 of FIG. 6B (i.e., the same number as the block in FIG. 6A as flow diagram 618 represents a replacement for the block in FIG. 6A). Turning to FIG. 6B and following flow diagram 618, it is determined whether any applications remain in the global list that have not yet been processed for incorporation into an ACL (block 654). Where one or more applications remain for processing (block 654), the first/next application in the global list is selected (block 656), and the ACL is updated to include all workloads identified as corresponding to the selected application (block 658). Where it is the first application being added to the ACL, the ACL that is formed is similar to that discussed above in relation to FIG. 4B. Where it is a second or later application being added to the ACL, the ACL that is formed is similar to that discussed above in relation to FIG. 4D.

Forward testing is applied using the updated ZTNA policy including the updated ACL (block 660). This block is shown in dashed lines, as detail of this block is set forth in the discussion in relation to FIG. 5 above. During forward testing, any network traffic that is allowed because of the default rule (i.e., any network traffic not allowed by a rule specific to a workload of a particular application) is flagged.

The flagged network traffic is reported to, for example, a network administrator as forward testing results (block 662). As only the most recently selected application (i.e., Application A in the case of incremental ACL 410, or Application B in the case of incremental ACL 430) has not yet been fully secured, any network traffic allowed because of the default rule is likely either communicating with a workload not originally identified as part of the newly selected application or is some type of non-allowed network traffic. Accordingly, the report provided to the network administrator includes a relatively small amount of information compared with that which would have possibly generated if an entire ACL for a network was being forward tested at once. Further, as only one application operating in the network has not previously been fully secured (i.e., the most recently selected application), a network administrator does not have to consider every application to identify with which application the network traffic corresponds. Rather, the network administrator need only consider the most recently selected application and the possibility of a non-allowed source or destination. This greatly simplifies the processes to be performed by a network administrator tasked with developing a ZTNA policy for a network.

It is determined whether a network administrator reviewing the reported results of forward testing has indicated a desired change to the rules in the ZTNA policy including the ACL (block 664). Where a change is indicated (block 664), the ZTNA policy including the ACL is modified to reflect the received change request (block 666) and the processes of blocks 658-664 are repeated for the updated ZTNA policy. The changes should be limited to the rules corresponding to the most recently selected application. Based upon the disclosure provided herein, one of ordinary skill in the art will recognize a variety of approaches that may be used in relation to different embodiments for a network administrator to indicate a change. As one example, a network administrator may simply edit the ACL to make a desired change.

Alternatively where no changes are indicated (block 664), the most recently selected application's policy is considered ZTNA compliant. In such a situation, each of the workloads associated with the most recently selected application are identified as secure (block 670). Identifying a workload as secure may be done, for example, by setting a secure flag associated with the particular workload as true. Based upon the disclosure provided herein, one of ordinary skill in the art will recognize a variety of approaches that may be used for identifying a workload as secure.

Further, the SECURED GROUP is augmented to include all of the workloads that were newly identified as secured (block 672). For the first selected application, such augmenting of the SECURED GROUP includes adding the workloads for the most recently selected application to an otherwise empty group. In contrast, for the second and later applications that are being processed, augmenting the SECURED GROUP will include adding the workloads newly identified as secured to those previously included in the SECURED GROUP.

Additionally the ACL is updated to include all secure workloads (block 674). This includes setting forth rules specifically allowing traffic of each workload corresponding to the selected application, and rules general to the SECURED GROUP. The rules general to the SECURED GROUP are two: (1) blocking traffic from any source to any destination included in the SECURED GROUP using any protocol or port, and (2) blocking traffic from any source included in the SECURED GROUP to any destination using any protocol or port. FIG. 4C, discussed above, shows an example of an ACL including a single application (i.e., Application A) that includes three identified workload tiers and their allowed traffic (traffic to a Web A, traffic from Web A to Application A, and traffic from Application A to Database A) with the application secured by the two SECURED GROUP rules; and FIG. 4E, discussed above, shows an example of an ACL including two applications (i.e., Application A and Application B) each with three identified workload tiers, and both of the applications secured by the two SECURED GROUP rules.

After updating the ZTNA policy including the ACL to reflect all rules related to the most recently selected application (blocks 670-674), it is determined whether another application remains in the global list that have not yet been processed for incorporation into the ACL (block 654).

Where one or more applications remain for processing (block 654), the processes of blocks 656-674 are repeated for the next selected application. Once no additional applications remain for processing in the global list (block 654), forward testing of the ZTNA policy for the currently received network traffic is complete (block 654), and the process is returned to block 620 of FIG. 6A.

Returning to FIG. 6A and following flow diagram 600, it is determined if processing the most recent block of network traffic (i.e., network traffic recently assembled in block 608) resulted in any change to the ZTNA policy (block 620). Where any changes resulted in the ZTNA policy (block 620), the processes of blocks 606-620 are repeated for another block of network traffic where only traffic packets that were not previously considered are processed for inclusion in the ZTNA policy including the ACL.

Alternatively, where no changes were made to the ZTNA policy (block 620), the assets and/or applications included in the focus list are considered protected. It is then determined whether there are any asset(s) and/or applications touched by the previously considered network traffic that have not yet been considered (block 622). Thus, for example, where the focus list originally included only a particular database, all workloads directly touching the database are secured, but one or more applications or other assets that are the source or destination of the previously considered traffic packets may not yet have been considered. Using FIG. 1A as an example, Database C 108 may be the destination of traffic packets corresponding of a data transfer from Application C 112 to Database C 108. This traffic would have been considered and included in the ZTNA policy, but other workloads and their traffic associated with Application C 112 that do not directly touch Database C 108 would not yet have been considered.

Where one or more assets and/or applications with direct contact to those in the focus list have not themselves been the subject of scrutiny applied to those in the focus list (block 622), these assets/applications are identified (block 628) and the focus list is augmented to include the additionally identified high value assets and/or applications (block 606). With the focus list thus augmented, the processes of blocks 608-628 are repeated where additional workloads and their traffic corresponding to the newly added high value assets and/or applications are considered and included in a growing ZTNA policy.

Once no additional high value assets and/or applications are identified (block 622), the ZTNA policy is considered complete for the original focus. As such, the default rule of the ACL included in the ZTNA policy is modified from "Allow" to "Block", to enforce ZTNA policy including the ACL (block 624) and the ZTNA policy including the ACL is deployed (block 626). Such deployment may be as simple as beginning operation of the network where a network security appliance uses the ACL to control what network traffic is allowed to pass to and from a secured network. FIG. 4F shows an example of an ACL after modification of the default rule.

It is possible that using such a focus will ultimately result in covering all assets and applications in a network environment. In some cases, however, one or more assets and/or applications in the network environment will be sufficiently isolated that performing the processes of flow diagram 600 will not result in covering all assets and/or applications. In some embodiments, the process may be purposely limited to a defined number of degrees of separation from the originally identified high value asset(s) and/or application(s) (i.e., those received in block 604). Such would be done by limiting the number of times block 622 would be allowed to identify additional non-considered assets and/or applications. In one particular embodiment, block 622 is only allowed to find additional assets and/or applications two times resulting in coverage of workloads within two degrees of separation from the originally identified high value asset(s) and/or application(s) (i.e., those received in block 604). Based upon the disclosure provided herein, one of ordinary skill in the art will recognize a variety of degrees of separation that would be appropriate in a given scenario in accordance with different embodiments.

Figure 7:
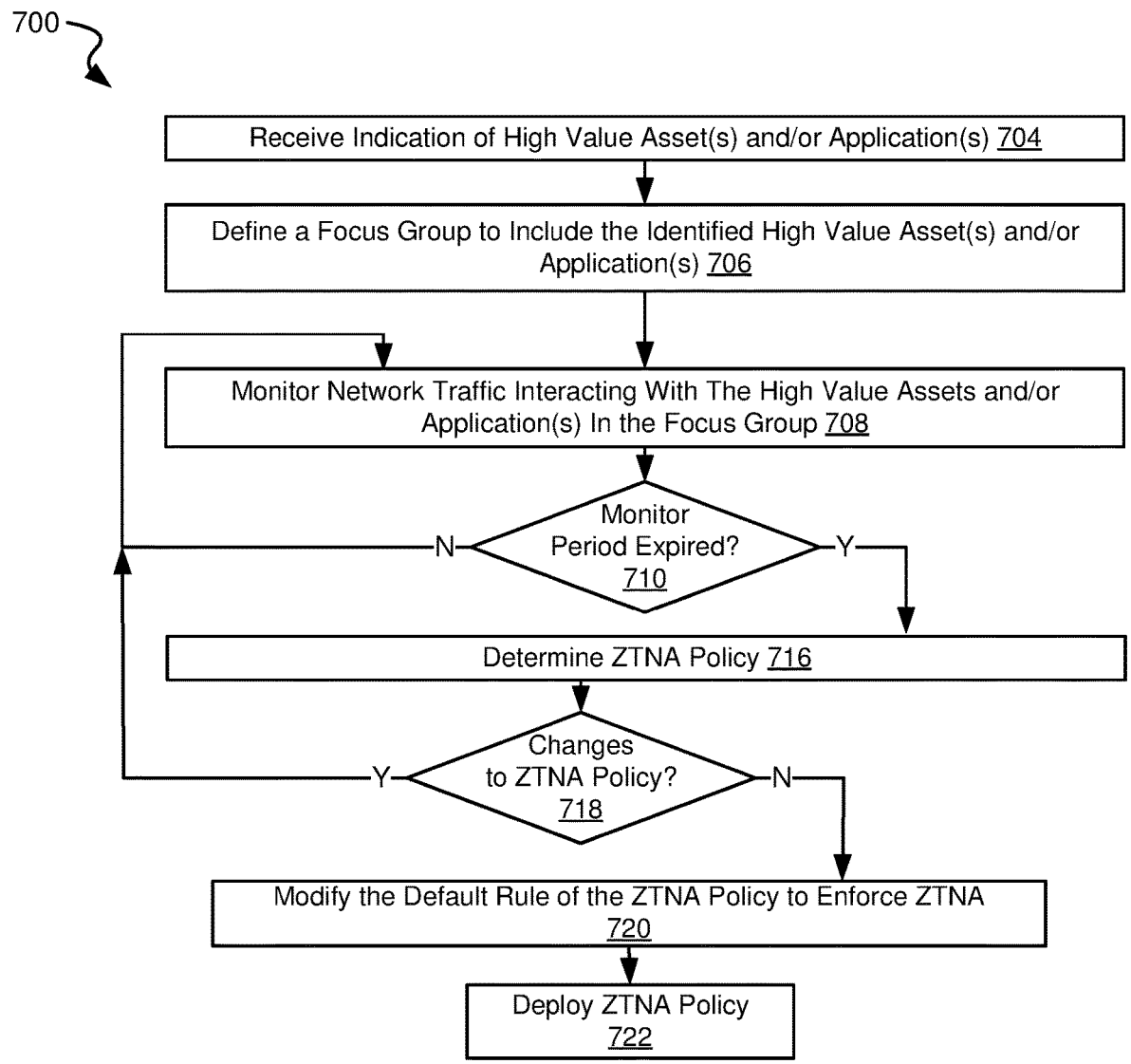
FIG. 7 is a flow diagram showing a method in accordance with one or more embodiments for developing a zero trust network access for specifically identified network elements.

Turning to FIG. 7, a flow diagram 700 shows a method in accordance with one or more embodiments for developing a zero trust network access for specifically identified network elements. Following flow diagram 700, an indication of a high value asset(s) and/or application(s) is received (block 704). The high value asset(s) and/or applications may be identified, for example, by a network administrator reviewing a physical asset map of a network and selecting one or more of the assets and/or applications operating in the network as a focus for a machine learning module responsible for identifying workloads and determining applications to which the workloads belong. As an example, the network administrator may identify a particular network database as a high value asset. The identified high value asset(s) and/or application(s) are then provided as an input. Based upon the disclosure provided herein, one of ordinary skill in the art will recognize a variety of high value asset(s) and/or application(s) that may be selected in accordance with different embodiments, and a number of mechanisms that may be used to identify the selected high value asset(s) and/or application(s) for processing.

A focus group is defined to include the newly identified high value asset(s) and/or application(s) (block 706). This focus group becomes the focus of the identification of workloads and applications to be secured.

Network traffic is monitored that is either transmitted to or received from one of the high value asset(s) and/or application(s) included in the focus group (block 708). Such traffic monitoring allows for identification of a number of workloads directly communicating with the specifically identified network elements. By focusing the monitoring on those network elements specifically identified in the focus group, only a subset of the overall network traffic is considered for grouping into similar destinations, origins, and/or the like for analysis. In some embodiments, such network traffic monitoring may be done in accordance with that disclosed in U.S. Pat. No. 10,944,723 entitled "Systems and Methods for Managing Endpoints and Security Policies in a Networked Environment" that was previously incorporated by reference. In particular, FIGS. 6-8 and the corresponding discussion in the aforementioned incorporated reference describe one approach for monitoring network traffic that may be used in relation to some embodiments discussed herein. Such monitoring relies, at least in part, on meta information such as, for example, source and destination of the network traffic, the ports used for the network communication, the protocol used for the communication, other characteristics regarding the application communication that are derived from deep-packet inspection of the traffic.

This process of monitoring (block 708) is continued for a defined period (block 710). The defined period may be fixed or user programmable. In some cases, the defined period is set to allow for a sufficient number of network transactions to occur such that multiple instances of traffic for each of the workloads associated with applications may be identified, and thus facilitate the automated identification of assets and corresponding applications within the network environment.

Turning to FIG. 8A, an example set 810 of workloads communicating with either an Application A or a Database C are shown. Such workloads may be identified as part of the workload monitoring process (i.e., block 708 of FIG. 7) where the focus list identifies Application A and Database C. As shown, set 810 includes four access control rules allowing specific network traffic (i.e., from Application A to the Web using TCP over port 80, from the Web to the Database C using TCP over port 443, from an Endpoint X to Database C using TCP over port 3020, and from an Endpoint Y to Application A using TCP over port 80).

Returning to FIG. 7, once the monitor period has expired (block 710), a ZTNA policy is determined for the workloads that include one of the assets and/or applications in the focus group as either a source or a destination (block 716). In some cases, forming the ZTNA policy may be done by a network administrator manually defining an ACL indicating that one or more of the identified workloads are allowable. Turning to FIG. 8B, an example ACL 820 for the workloads included in set 810 is shown. As shown, ACL 820 includes five rules—one for each of the workloads in set 810 (Rules 1-4), and a default rule (Rule 5).

Returning to FIG. 7, it is determined if processing the most recent block of network traffic (i.e., network traffic recently assembled in block 708) resulted in any change to the ZTNA policy (block 718). Where any changes resulted in the ZTNA policy (block 718), the processes of blocks 708-718 are repeated for another block of network traffic where only workloads that were not previously considered are processed for inclusion in the ZTNA policy including the ACL.

Alternatively, where no changes were made to the ZTNA policy (block 718), the assets and/or applications included in the focus list are considered protected. As such, the default rule of the ACL included in the ZTNA policy is modified from "Allow" to "Block", to enforce ZTNA policy including the ACL (block 720) and the ZTNA policy including the ACL is deployed (block 722). Such deployment may be as simple as beginning operation of the network where a network security appliance uses the ACL to control what network traffic is allowed to pass to and from a secured network. FIG. 8C shows an example of an ACL 830 after modification of the default rule.

Turning to FIGS. 9A-9D, flow diagrams 900, 950, 980*a* and 980*b* show a method in accordance with some embodiments for automatically determining a focus for network security development based upon risk. Following flow diagram 900 of FIG. 9A, risk scores are developed and assigned to each application, application tier, and workload executing on the network (block 950). Block 950, shown in dashed lines as one embodiment of developing and assigning risk scores, is shown in more detail in a flow diagram of the same number in FIG. 9B. Based upon the disclosure provided herein, one of ordinary skill in the art will recognize other approaches and modifications to risk score development and assignment that may be used in relation to different embodiments.

Figure 9A:
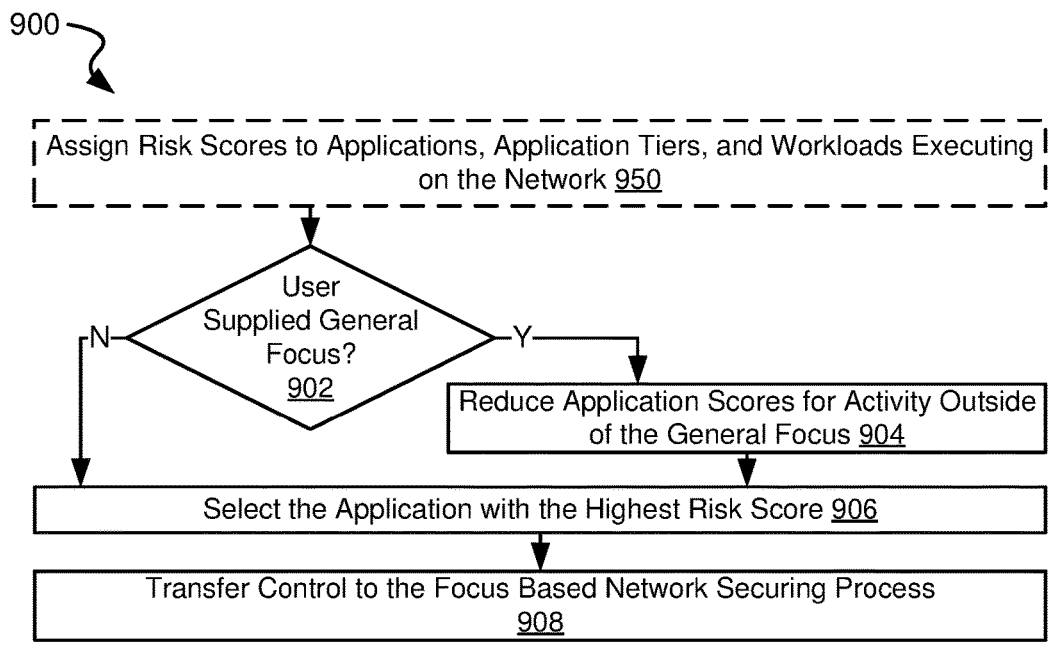
FIGS. 9A-9D are flow diagrams showing a method in accordance with some embodiments for automatically determining a focus for network security development based upon risk.
Figure 9B:
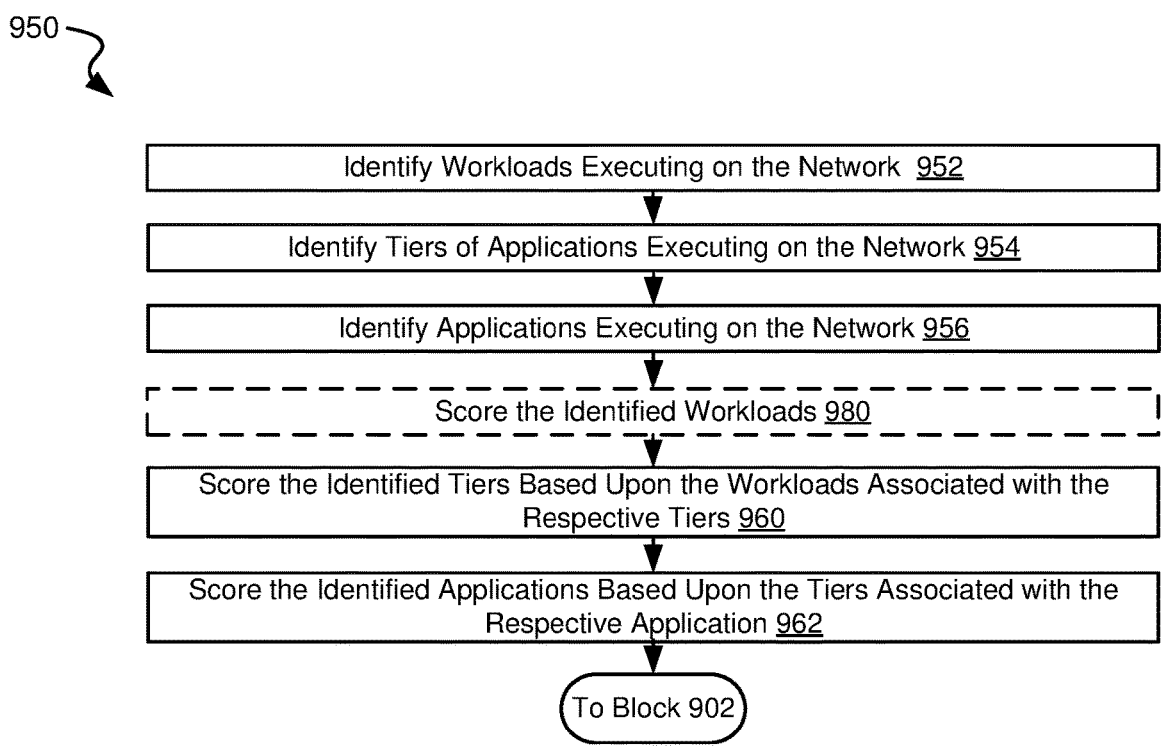

Turning to FIG. 9B and following flow diagram 950, a process for developing and assigning risk scores to each application, application tier, and workload executing on the network is shown in accordance with some embodiments. All workloads executing on the network are identified (block 952). In addition, all application tiers involved with the identified workloads are identified (block 954), and all applications associated with the identified applications are identified (block 956). Once this has been completed, any application and application tier associated with a workload currently executing on the network is identified. In some embodiments, the applications, application tiers, and workloads are identified based upon monitored network traffic. In some embodiments such network traffic monitoring and characterization may be done in accordance with that disclosed in U.S. Pat. No. 10,944,723 entitled "Systems and Methods for Managing Endpoints and Security Policies in a Networked Environment" that was previously incorporated by reference. In particular, FIGS. 6-8 and the corresponding discussion in the aforementioned incorporated reference describe one approach for monitoring network traffic that may be used in relation to some embodiments discussed herein. Such monitoring relies, at least in part, on meta information such as, for example, source and destination of the network traffic, the ports used for the network communication, the protocol used for the communication, other characteristics regarding the application communication that are derived from deep-packet inspection of the traffic.

Scores are determined and assigned to each of the identified workloads (block 980). Block 980, shown in dashed lines as one embodiment of developing and assigning risk scores, is shown in more detail in a flow diagram 980*a* in FIG. 9C or alternatively in a flow diagram 980*b* in FIG. 9D. Based upon the disclosure provided herein, one of ordinary skill in the art will recognize other approaches and modifications to risk score development and assignment that may be used in relation to different embodiments.

Figure 9C:
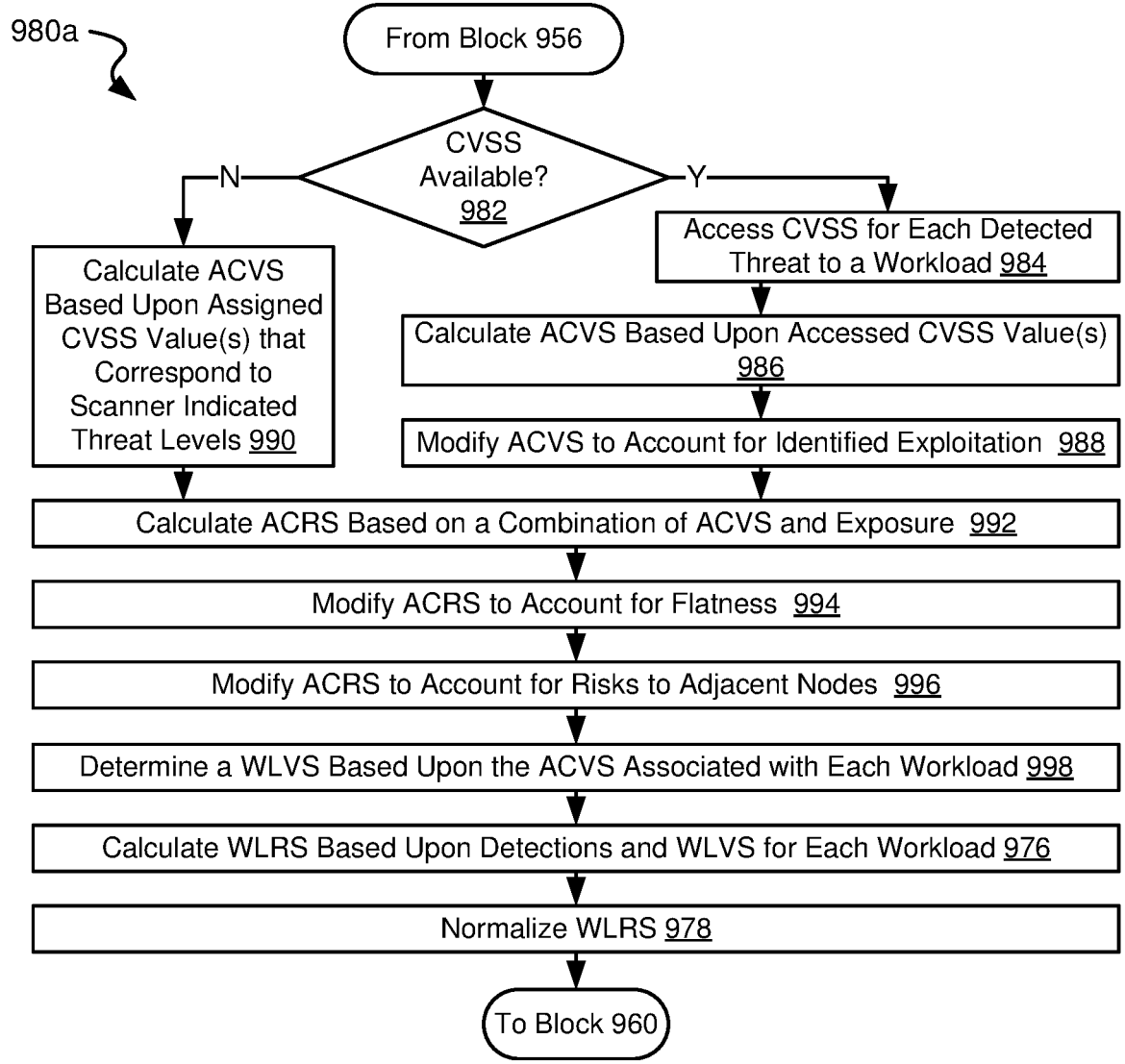

Turning to FIG. 9C and following flow diagram 980*a*, a process for calculating an application component vulnerability risk score (ACVS) is shown in accordance with some embodiments. It is determined whether CVSS values are available for one or more threats detected in traffic packets to and from the workload (block 982). CVSS values may be available from a third-party database that maintains a listing of CVSS values for particular threats, and thus CVSS values are available where access to the third party database is available. Where CVSS data is available (block 982), the CVSS values corresponding to the threats detected in traffic packets relevant to the scored workload are accessed (block 984). In some embodiments, the CVSS score may be compliant with the CVSS specification document available at www.first.org.

In addition, the ACVS is calculated (block 986). Such an ACVS calculation includes determining whether a threat alert has been seen for the workload and how many threat alerts have been received. The ACVS is then calculated for each of the threat alerts in accordance with the following equation:

ACVS=0.25*ACVS+0.75*function((severity scalar*number of the particular threat alerts*CVSS for the particular alert)/severity scalar*total number of threat alerts).

The severity scalar is a value given for a CVSS within a defined range. In one particular embodiment, the severity scalar is forty (40) for CVSS greater than 8.5, the severity scalar is thirty (30) for a CVSS that is greater than 6.0 and less than 8.5, the severity scalar is twenty (20) for a CVSS greater than 3.0 and up to 6.0, and the severity scalar for a CVS up to 3.0 is ten (10). Based upon the disclosure provided herein, one of ordinary skill in the art will recognize a variety of values of severity scalars that could be used in relation to different ranges of CVSS values. As a specific example, if the current ACVS score is 7.2, three particular threat alerts with a CVSS of 9.8 are received, and three particular threat alerts are received with a CVSS of 5.5 are received, the updated ACVS value will be calculated as follows:

ACVS=0.25*7.2+0.75(40*3*9.8+30*0*0+20*3*5.5)/(40*3+20*3)=8.1 (rounded).

The ACVS is modified to account for exploitation information available from a network scanner operating on the network (block 988). Such modification is accounted for by multiplying the appropriate Scanner Severity Multiplication Factor (SSMF) scalar value in accordance with the following equation:

ACVS=ACVS*SSMF, where the appropriate CVES is selected from the following table:

| Exploitation Level | SSMF |
| --- | --- |
| No Scanner Information | 0.97 |
| No Match Found | 0.98 |
| Match Found | 1.0 |

Alternatively, where no CVSS score is available (block 982), but scanner information for a threat alert is available from a network scanner operating on the network, assigned CVSS scores can be used based upon the severity of the threat indicated by the scanner information (block 990). Thus, for example, where the scanner information characterizes threats as either critical, severe, or moderate, a value for a CVSS corresponding to the degree of severity may be used. In one embodiment, a value of 9.5 is assigned as a CVSS value where the scanner information identifies the threat as critical; a value of 7.5 is assigned as a CVSS value where the scanner information identifies the threat as severe; and a value of 5.5 is assigned as a CVSS value where the scanner information identifies the threat as moderate. As a specific example, where the current ACVS score is 7.2, two particular threat alerts indicated as critical (i.e., an assigned CVSS of 9.5), one particular threat alert is indicated as severe (i.e., an assigned CVSS of 9.5), and one particular threat alert is indicated as moderate (i.e., an assigned CVSS of 5.5) are received, the updated ACVS value will be will be calculated as follows:

ACVS=0.25*7.2+0.75(40*2*9.5+30*1*7.5+20*1*5.5)/(40*2+30*1+20*1)=8.1 (rounded).

An application component risk score (ACRS) is calculated based upon a combination of the ACVS and the level of exposure of the workload (block 992). In particular, the ACVS is modified in accordance with the following equation:

ACRS=ACVS*PEMF, where PEMF is the exposure value from the following table:

| Public Exposure | PEMF |
| --- | --- |
| No Information Available | 0.97 |
| Publicly Exposed | 1.0 |
| Not Publicly Exposed | 0.95 |

The previously described ACRS value is modified to account for flatness (i.e., a level of communication with other application portions within the same tier) with the scored workload (block 994). In particular, the ACRS is modified in accordance with the following equation:

ACRS=ACRS*FMF, where FMF is the flatness value from the following table:

| Communication W/In Tier | FMF |
| --- | --- |
| No | 0.98 |
| Yes | 1.0 |

The previously described ACRS value is modified to account for risk scores of adjacent nodes to the scored workload (block 996). The risk value for the nodes adjacent to the scored workload is the ACRS value the adjacent node. In particular, the ACRS is modified in accordance with the following equation:

ACRS=0.7*ACRS+0.3*f(weighted sum of adjacent node risk/total number of adjacent nodes), Thus, for example, where the scored workload has an ACRS of 8.6 and is in direct communication with two other nodes, and one of the nodes has a risk score of 9.0 and a weighting of 0.4 and the other node has a risk score of 4.5 and a weighting of 0.2, the resulting ACRS value is calculated as follows:

ACRS=0.7*8.6+0.3*((0.4*9.0+0.2*4.5)/0.4+0.2)=8.3 (rounded).

The WLVS is determined for each workload (block 998). The WLVS is set equal to the highest ACVS associated with the scored workload. The WLRS score is then calculated based upon the WLVS to incorporate various factors associated with the workload including an accessed URL reputation value (URLRV) that may be accessed from the same third party database from which CVSS is accessed, and assigned event values that are included where an IOA, malware detection, and/or data loss prevention (DLP) detection (DD) is identified in relation to the scored workload (block 976). In some embodiments, the assigned values may be those set forth in the table below:

| Detected Event | Assigned Value |
|---|---|
| Malware Detected | MD = 80 |
| Malware Not Detected | MD = 0 |
| DLP Detected | DD = 80 |
| DLP Not Detected | DD = 0 |
| IOA Detected | MD = 80 |
| IOA Not Detected | MD = 0 |

Using the aforementioned information, WLRS is calculated in accordance with the following equation:

$$WLRS = SquareRoot(WLVS^2 + URLRV^2 + MD^2 + DD^2 + IOA^2).$$

The resulting WLRS value is again normalized (block 978). Such normalization controls for slope in accordance with the following equation:

$$WLRCS = k * \tanh(a * WLRCS),$$

where k is a scaling factor that determines the maximum value of the function, a is the logistic growth rate or steepness of the function, a is, and tanh is the hyperbolic tangent function. The processing returns to block 960 of FIG. 9B.

Figure 9D:
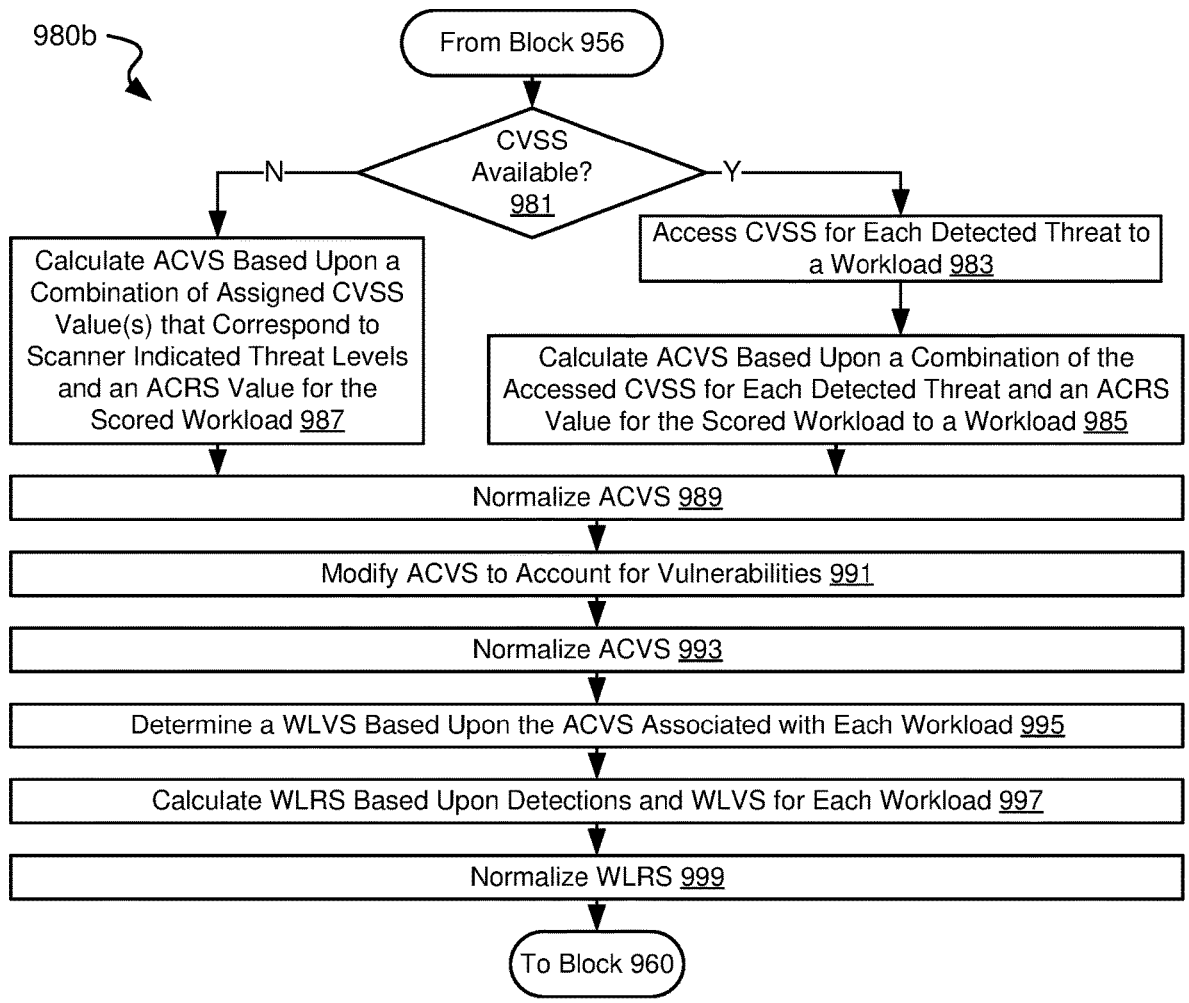

Turning to FIG. 9D and following flow diagram 980b, a process for calculating an application component vulnerability risk score (ACVS), a workload vulnerability score (WVLS), and a workload risk score (WLRS) is shown in accordance with some embodiments. It is determined whether CVSS values are available for one or more threats detected in relation to the workload (block 981). Where CVSS data is available (block 981), the ACVS is determined by first accessing a CVSS score accessed from a third party database where the CVSS is available (block 983). The CVSS score may be compliant with the CVSS specification document available at www.first.org. In addition, ACVS is calculated (block 985). Such an ACVS calculation includes determining whether a threat alert has been seen for the workload and how many threat alerts have been received. The ACVS is then calculated for each of the threat alerts in accordance with the following equation:

$$ACVS = SquareRoot((ACRS)^2 + Sum(CVSS^2 + *100)),$$

where ACRS is the application component risk score derived from the base score (ACRS) for an application that is initially determined based on the possible vulnerabilities and threats on that application.

Alternatively, where no CVSS score is available (block 981) but scanner information for a threat alert is available from a network scanner operating on the network, assigned CVSS scores can be used based upon the severity of the threat indicated by the scanner information (block 987). Thus, for example, where the scanner information characterizes threats as either critical, severe, or moderate, a value for a CVSS corresponding to the degree of severity may be used. In one embodiment, a value of 9.5 is assigned as a CVSS value where the scanner information identifies the threat as critical; a value of 7.5 is assigned as a CVSS value where the scanner information identifies the threat as severe; and a value of 5.5 is assigned as a CVSS value where the scanner information identifies the threat as moderate. As a specific example, where the current ACVS score is 7.2, two particular threat alerts indicated as critical (i.e., an assigned CVSS of 9.5), one particular threat alert is indicated as severe (i.e., an assigned CVSS of 9.5), and one particular threat alert is indicated as moderate (i.e., an assigned CVSS of 5.5) are received, the updated ACVS value will be will be calculated as follows:

$$ACVS = SquareRoot((ACRS)^2 + Sum((assigned\ CVSS)^2 + *100)).$$

The resulting ACVS value is then normalized (block 989). Such normalization controls for slope in accordance with the following equation:

$$ACVS = k * \tanh(a * ACVS),$$

where k is a scaling factor that determines the maximum value of the function, a is the logistic growth rate or steepness of the function, and tanh is the hyperbolic tangent function.

The ACVS is then modified to account for vulnerabilities (block 991). The modification is done in accordance with the following equation:

$$ACVS = SquareRoot((ACVS)^2 + Sum((vulnerability\ score))^2),$$

where vulnerability scores may be either accessed from the same third party database from which CVSS was accessed, or assigned based upon information available from a network scanner. Where the information from the network scanner is used, such vulnerability scores may be assigned as shown in the table below:

| Scanner Severity | Vulnerability Score |
|---|---|
| 1 <= severity <= 2 | 70 |
| 2 < severity < 5 | 85 |
| 4 <= severity <= 5 | 100 |

The resulting ACVS value is again normalized (block 993). Such normalization controls for slope in accordance with the following equation:

$$ACVS = k * \tanh(a * ACVS),$$

where k is a scaling factor that determines the maximum value of the function, a is the logistic growth rate or steepness of the function, a is, and tanh is the hyperbolic tangent function.

The WLVS is determined for each workload (block 995). The WLVS is set equal to the highest ACVS associated with the scored workload. The WLRS score is then calculated based upon the WLVS to incorporate various factors associated with the workload including an accessed URL reputation value (URLRV) that may be accessed from the same third party database from which CVSS is accessed, and assigned event values that are included where an IOA, malware detection, and/or data loss prevention (DLP) detection (DD) is identified in relation to the scored workload (block 997). In some embodiments, the assigned values may be those set forth in the table below:

| Detected Event | Assigned Value |
|---|---|
| Malware Detected | MD = 80 |
| Malware Not Detected | MD = 0 |
| DLP Detected | DD = 80 |
| DLP Not Detected | DD = 0 |
| IOA Detected | MD = 80 |
| IOA Not Detected | MD = 0 |

Using the aforementioned information, WLRS is calculated in accordance with the following equation:

$$WLRS = SquareRoot(WLVS^2 + URLRV^2 + MD^2 + DD^2 + IOA^2).$$

The resulting WLRS value is again normalized (block 999). Such normalization controls for slope in accordance with the following equation:

$$WLRCS = k*\tanh(a*WLRCS),$$

where k is a scaling factor that determines the maximum value of the function, a is the logistic growth rate or steepness of the function, a is, and tanh is the hyperbolic tangent function. The processing returns to block 960 of FIG. 9B.

Returning to FIG. 9B, the identified tiers are scored based upon the workloads associated with each respective tier (block 960). In some embodiments, the vulnerability score for each tier, Application Tier Vulnerability Score (ATVS) is equal to the maximum WLVS associated with the respective tier, and the risk score for each tier, Application Tier Risk Score (ATRS) is equal to the maximum WTRS associated with the respective tier. Next the identified applications are scored based upon the tiers associated with each respective application (block 962). In some embodiments, the vulnerability score for each application (AVS) is equal to the maximum ATVS associated with the respective application, and the risk score for each application (ARS) is equal to the maximum ATRS associated with the respective application. Processing is then returned to block 902 of FIG. 9A.

Returning to FIG. 9A, it is determined whether a user-supplied general focus is available (block 902). A user-supplied general focus identifies a subset of applications and/or portions of the network that are to be considered for security purposes. Thus, for example, a user may identify a particular database. In such a case, only the database and any applications that communicate with the database are considered. Where a user-supplied general focus is available (block 902), all applications scores that are not within the user-supplied general focus are reduced in value (block 904). In some embodiments, this may include multiplying the non-included scores by a scalar that is less than unity. In some cases, the scalar is zero (0). Based upon the disclosure provided herein, one of ordinary skill in the art will recognize a variety of scalars that may be used in relation to different embodiments.

The application that has the highest risk score (ARS) is selected as the focal point for the next round of securing the network (block 906). This selected application is then identified with a network securing process and processing control is transferred to the network securing process (block 908). In some embodiments, the network securing process may be done in accordance with that discussed above in relation to FIG. 7 where the selected application is indicated as the high value application (block 704).

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for securing network access using automatically generated network focus, the method comprising:
    accessing, by a processing resource, at least a first risk score for a first application and a second risk score for a second application, wherein the first risk score indicates a higher risk than the second risk score;
    selecting, by the processing resource, the first application based in part on the first risk score indicating a higher risk than the second risk score;
    scoring, by the processing resource, the first application to yield the first risk score by:
        scoring at least a first application tier of the first application to yield a first tier risk score and a second application tier of the first application to yield a second tier risk score; and
        generating the first risk score based at least in part on the first tier risk score, wherein the first tier risk score indicates a higher risk than the second tier risk score and the generation of the first risk score based at least in part on the first tier risk score includes selecting the first tier risk score; and
    securing, by the processing resource, a network from a focus of the first application.

2. The method of claim 1, wherein the securing the network from a focus of the first application comprises:
    monitoring, by the processing resource, network activity to yield a set of network traffic;
    identifying, by the processing resource, a set of workloads in the set of network traffic that are either sourced from the first application or destined to the first application; and
    augmenting, by the processing resource, an access control list to include one or more workload rules allowing the set of workloads.

3. The method of claim 2, wherein the set of network traffic is a first set of network traffic, wherein the set of workloads is a first set of workloads, the method further comprising:
    monitoring, by the processing resource, network activity to yield a second set of network traffic;
    identifying, by the processing resource, a second set of workloads in the second set of network traffic that are either sourced from any of at least one network focus, or destined to any of the at least one network focus;
    identifying, by the processing resource, at least one workload in the second set of workloads that is not in the first set of workloads; and
    augmenting, by the processing resource, the access control list to include the at least one workload in the second set of workloads that is not in the first set of workloads.

4. The method of claim 2, the method further comprising:
    identifying, by the processing resource, a third application associated with two or more workloads in the set of workloads, and a fourth application associated with two or more other workloads in the set of workloads;
    wherein augmenting, by the processing resource, the access control list to include one or more workload rules allowing the set of workloads is an incremental modification, and wherein the incremental modification includes:

augmenting, by the processing device, the access control list to include first workload rules corresponding to the two or more workloads associated with the third application to yield a first augmented access control list;

forward testing, by the processing device, the first augmented access control list;

subsequent to forward testing the first augmented access control list, augmenting, by the processing device, the first access control list to include second workload rules corresponding to the two or more workloads associated with the fourth application to yield a second augmented access control list; and forward testing, by the processing device, the second augmented access control list.

5. A network securing system, the network securing system comprising: a processing resource;

a non-transitory computer-readable medium, coupled to the processing resource, having stored therein instructions that when executed by the processing resource cause the processing resource to:

access at least a first risk score for a first application and a second risk score for a second application, wherein the first risk score indicates a higher risk than the second risk score;

select the first application based in part on the first risk score indicating a higher risk than the second risk score;

score, by the processing resource, the first application to yield the first risk score by:

scoring at least a first application tier of the first application to yield a first tier risk score and a second application tier of the first application to yield a second tier risk score; and generating the first risk score based at least in part on the first tier risk score, wherein the first tier risk score indicates a higher risk than the second tier risk score and the generation of the first risk score based at least in part on the first tier risk score includes selecting the first tier risk score; and secure a network from a focus of the first application.

6. The network securing system of claim 5, wherein the instructions that when executed by the processing resource cause the processing resource to secure the network from the focus of the first application includes instructions that when executed by the processing resource cause the processing resource to:

monitor network activity to yield a set of network traffic;

identify a set of workloads in the set of network traffic that are either sourced from the first application or destined to the first application; and augment an access control list to include one or more workload rules allowing the set of workloads.

7. The network securing system of claim 6, wherein the set of network traffic is a first set of network traffic and the set of workloads is a first set of workloads, the instructions further cause the processing resource to:

monitor network activity to yield a second set of network traffic;

identify a second set of workloads in the second set of network traffic that are either sourced from any of the at least one network focus, or destined to any of the at least one network focus;

identify at least one workload in the second set of workloads that is not in the first set of workloads; and augment the access control list to include the at least one workload in the second set of workloads that is not in the first set of workloads.

8. The network securing system of claim 6, wherein the instructions further cause the processing resource to:

identify a third application associated with two or more workloads in the set of workloads, and a fourth application associated with two or more other workloads in the set of workloads;

wherein augmenting the access control list to include one or more workload rules allowing the set of workloads is an incremental modification, and wherein the incremental modification includes:

augmenting the access control list to include first workload rules corresponding to the two or more workloads associated with the third application to yield a first augmented access control list;

forward testing the first augmented access control list;

subsequent to forward testing the first augmented access control list, augmenting the first access control list to include second workload rules corresponding to the two or more workloads associated with the fourth application to yield a second augmented access control list; and forward testing the second augmented access control list.

9. A non-transitory computer-readable storage medium embodying a set of instructions, which when executed by a processing resource, causes the processing resource to:

access at least a first risk score for a first application and a second risk score for a second application, wherein the first risk score indicates a higher risk than the second risk score;

select the first application based in part on the first risk score indicating a higher risk than the second risk score;

score, by the processing resource, the first application to yield the first risk score by:

scoring at least a first application tier of the first application to yield a first tier risk score and a second application tier of the first application to yield a second tier risk score; and generating the first risk score based at least in part on the first tier risk score, wherein the first tier risk score indicates a higher risk than the second tier risk score and the generation of the first risk score based at least in part on the first tier risk score includes selecting the first tier risk score; and secure a network from a focus of the first application.

10. The non-transitory computer-readable storage medium of claim 9, wherein the instructions that cause the processing resource to secure the network from the focus of the first application includes instructions that cause the processing resource to:

monitor network activity to yield a set of network traffic;

identify a set of workloads in the set of network traffic that are either sourced from the first application or destined to the first application; and augment an access control list to include one or more workload rules allowing the set of workloads.

11. The non-transitory computer-readable storage medium of claim 10, wherein the set of network traffic is a first set of network traffic and the set of workloads is a first set of workloads, the instructions further cause the processing resource to:

monitor network activity to yield a second set of network traffic;

identify a second set of workloads in the second set of network traffic that are either sourced from any of the at least one network focus, or destined to any of the at least one network focus;

identify at least one workload in the second set of workloads that is not in the first set of workloads; and augment the access control list to include the at least one workload in the second set of workloads that is not in the first set of workloads.

12. The non-transitory computer-readable storage medium of claim 10, wherein the instructions further cause the processing resource to:

identify a third application associated with two or more workloads in the set of workloads, and a fourth application associated with two or more other workloads in the set of workloads;

wherein augmenting the access control list to include one or more workload rules allowing the set of workloads is an incremental modification, and wherein the incremental modification includes:

augmenting the access control list to include first workload rules corresponding to the two or more workloads associated with the third application to yield a first augmented access control list;

forward testing the first augmented access control list;

subsequent to forward testing the first augmented access control list, augmenting the first access control list to include second workload rules corresponding to the two or more workloads associated with the fourth application to yield a second augmented access control list; and forward testing the second augmented access control list.

* * * * *